US011615076B2

(12) United States Patent
Sreenivasan et al.

(10) Patent No.: US 11,615,076 B2
(45) Date of Patent: Mar. 28, 2023

(54) MONOLITH DATABASE TO DISTRIBUTED DATABASE TRANSFORMATION

(71) Applicant: INTERNATIONAL BUSINESS MACHINES CORPORATION, Armonk, NY (US)

(72) Inventors: Balakrishnan Sreenivasan, Jayanagar (IN); Harish Bharti, Pune (IN); Vaibhav Mayuresh Shah, Ahmedabad (IN); Abhay Kumar Patra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 17/374,308

(22) Filed: Jul. 13, 2021

(65) Prior Publication Data

US 2023/0018975 A1      Jan. 19, 2023

(51) Int. Cl.
*G06F 16/00* (2019.01)
*G06F 16/23* (2019.01)
(Continued)

(52) U.S. Cl.
CPC ...... *G06F 16/2379* (2019.01); *G06F 16/2282* (2019.01); *G06F 16/27* (2019.01);
(Continued)

(58) Field of Classification Search
None
See application file for complete search history.

(56) References Cited

U.S. PATENT DOCUMENTS 10,430,250 B2   10/2019  Ishikawa et al.
10,579,370 B2    3/2020  Gupta
(Continued)

OTHER PUBLICATIONS

Prasandy, T., et al., "Migrating Application from Monolith to Microservices", 2020 International Conference on Information Management and Technology (ICIMTech), Aug. 13-14, 2020, pp. 726-731.
Kumar, R., "Selecting the Right Database for Your Microservices", The New Stack, Aug. 13,2018, 24 pgs.
(Continued)

*Primary Examiner* — Debbie M Le
(74) *Attorney, Agent, or Firm* — Michael A. Petrocelli; George S. Blasiak; Heslin Rothenberg Farley & Mesiti P.C.

(57) ABSTRACT

Methods, computer program products, and systems are presented. The methods include, for instance: obtaining domain data sources on a monolith database operating in a subject domain. Entities and relations of the monolith database are identified. By decomposing the entities of the monolith database for key entities in the subject domain, entities for a distributed database that is functionally equivalent to the monolith database are identified. Transactions performed on the monolith database and the entities of the distributed database involved therein are identified and the transactions are decomposed for the distributed database. Silhouette clustering on the distributed database regarding aspects of performance, scalability, and availability that improves the aspects of the distributed database over the monolith database is performed and the distributed database is checked for eventual consistency amongst the distributed database and one or more replicas of the distributed database before deployed to replace the monolith database.

20 Claims, 17 Drawing Sheets

(51) Int. Cl.
- *G06F 16/27* (2019.01)
- *G06N 20/00* (2019.01)
- *G06F 16/22* (2019.01)
- *G06F 16/28* (2019.01)

(52) U.S. Cl.
CPC .......... *G06F 16/285* (2019.01); *G06F 16/288* (2019.01); *G06N 20/00* (2019.01)

(56) References Cited

U.S. PATENT DOCUMENTS

| | | | |
|---|---|---|---|
| 11,068,245 B2* | 7/2021 | Jaeger | G06F 8/4441 |
| 11,356,525 B2* | 6/2022 | Miedema | H04L 67/562 |
| 11,461,322 B1* | 10/2022 | Plenderleith | G06F 16/2456 |
| 2020/0237154 A1* | 7/2020 | Donnelly | A47J 37/0704 |
| 2021/0011688 A1 | 1/2021 | Sasidharan et al. | |
| 2021/0390090 A1* | 12/2021 | Eberlein | G06F 16/2379 |

OTHER PUBLICATIONS

Kharenko, A., "*Monolithic* vs. *Microservices Architecture | Monolithic Architecture*", Microservices Practitioner Articles, Oct. 9, 2015, 6 pgs.

Behara, S., "Breaking the Monolithic Database in Your Microservices Architecture", Microservices Zone, Sep. 12, 2018, 5 pgs.

Mell, Peter, et al., "The NIST Definition of Cloud Computing", NIST Special Publication 800-145, Sep. 2011, Gaithersburg, MD, 7 pgs.

Engeleiter, K., "Using Automatic Workload Repository for Database Tuning: Tips for Expert DBAs", Oracle, 46 pgs. Retrieved on Apr. 1, 2021 from the Internet URL: <https://www.oracle.com/technetwork/database/manageability/diag-pack-ow09-133950.pdf>.

"*Microservices* vs *Monolithic Architecture*", MuleSoft, 2021, 4 pgs. Retrieved on Jul. 13, 2021 from the Internet URL: <https://www.mulesoft.com/resources/api/microservices-vs-monolithic>.

* cited by examiner

500

510
PURCHASE (20)

520
INQUIRY (30)

530
ESTIMATES (40)

540
ORDERS (80)

550
INVOICES (80)

| TABLE_ID | TABLE_NAME | DESCRIPTION | SUBJECT AREA | CATEGORY |
|---|---|---|---|---|
| T001 | PURCHASE | X | PURCHASE MODULE | OPERATIONAL TABLE |
| T002 | SALES | Y | SALES MODULE | OPERATIONAL TABLE |
| T004 | FINANCE | Z | FINANCE | OPERATIONAL TABLE |
| T003 | ETL_RUN_CTRL | W | UNKNOWN | OPERATIONAL TABLE |

710   720   730   740   750

X: "A table to record inquiries, orders and status related to purchase transactions."

Y: "A table to record inquiry, order, invoice, and status related to sales transactions."

Z: "A table to record account receivable and payable information."

W: "A table to record ETL interface execution timestamp."

| TABLE ID | WHERE CLAUSE | VALUES | FREQUENCY | TIME TAKEN |
|---|---|---|---|---|
| T1 | COLUMN1 | XYZ | 50 | 200 MINS |
| *T1* | *COLUMN2* | *XYZ* | *20* | *10 MINS* |
| T1 | COLUMN3 | ABC | 10 | 10 MINS |
| T1 | COLUMN4 | ABC | 2 | 300 MINS |
| ... | ... | ... | ... | ... |

| TABLE ID | COLUMN/TABLE | TIME TAKEN |
|---|---|---|
| T1 | C1 | 1 MIN |
| T1 | C3 | 0.5 MIN |
| T1 | C2 | 2 MINS |
| T2 | C1 | 5 MINS |
| ... | ... | ... |

| TABLE ID (1410) | COLUMN (1430) | VALUE (1450) | TIME TAKEN (1470) |
|---|---|---|---|
| *T1* | *C1* | *V1* | *10 MIN* |
| T1 | C1 | V2 | 0.5 MIN |
| T2 | C4 | V1 | 2 MINS |
| T2 | C1 | V1 | 5 MINS |
| ... | ... | ... | ... |

MONOLITH DATABASE TO DISTRIBUTED DATABASE TRANSFORMATION

TECHNICAL FIELD

The present disclosure relates to database transformation, and more particularly to methods, computer program products, and systems for transforming a monolith database system to a distributed database system by machine learning modeling of objects and operations of the monolith database system.

BACKGROUND

With rapidly evolving information technology (IT) environment, caused by various new computing paradigms such as cloud computing and ubiquitous computing, organizations using legacy IT systems need to modernize their IT systems in order to stay compatible with evolving IT environment outside of the organizations, or to take advantage of new technologies in terms of cost and performance. In modernizing their legacy IT systems, organizations may employ a cloud native architecture for their legacy applications to allow dynamic and agile development of applications. The cloud native architecture takes a modular approach in building, running, and updating software application by use of a suite of cloud-based microservices offered by cloud service providers. With respect to a monolithic database of the legacy IT system for persistent data storage, it is desirable to have a solution to modernize the monolithic database based on evolved database technologies such as a cloud database, in-memory data storage, and/or distributed database technology for performance improvement as well as providing the same data service as in the monolithic database with the same data integrity.

SUMMARY

The shortcomings of the prior art are overcome, and additional advantages are provided, through the provision, in one aspect, of a method. The method includes, for instance: obtaining, by one or more processors, domain data sources on a monolith database of a database client operating in a subject domain; identifying, by the one or more processors, entities and relations of the monolith database; presenting, by the one or more processors, entities for a distributed database that is functionally equivalent to the monolith database in a metadata table, by decomposing the entities of the monolith database for key entities in the subject domain; identifying, by the one or more processors, transactions performed on the monolith database and the entities of the distributed database involved therein; decomposing, by the one or more processors, the transactions performed on the monolith database into one or more transactions for the distributed database; performing, by the one or more processors, silhouette clustering on the distributed database regarding aspects of performance, scalability, and availability that improves the aspects of the distributed database over the monolith database; ascertaining, by the one or more processors, the distributed database provides eventual consistency amongst the distributed database and one or more replicas of the distributed database; and deploying, by the one or more processors, the distributed database in place of the monolith database for the database client.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts an example of the classification machine learning model of FIG. 3, in accordance with one or more embodiments set forth herein;

FIG. 7 depicts an example of the metadata table of FIG. 3, in accordance with one or more embodiments set forth herein;

FIG. 11 depicts an example of an entity in a table as a candidate for performance-based node separation resulting from block 850 of FIG. 8, in accordance with one or more embodiments set forth herein;

FIG. 13 depicts an example of an entity in a table as a candidate for scalability-based node separation resulting from block 1220 of FIG. 12, in accordance with one or more embodiments set forth herein;

FIG. 14 depicts an example of an entity in a table as a candidate for availability-based node separation resulting from block 1230 of FIG. 12, in accordance with one or more embodiments set forth herein;

DETAILED DESCRIPTION

Figure 1:
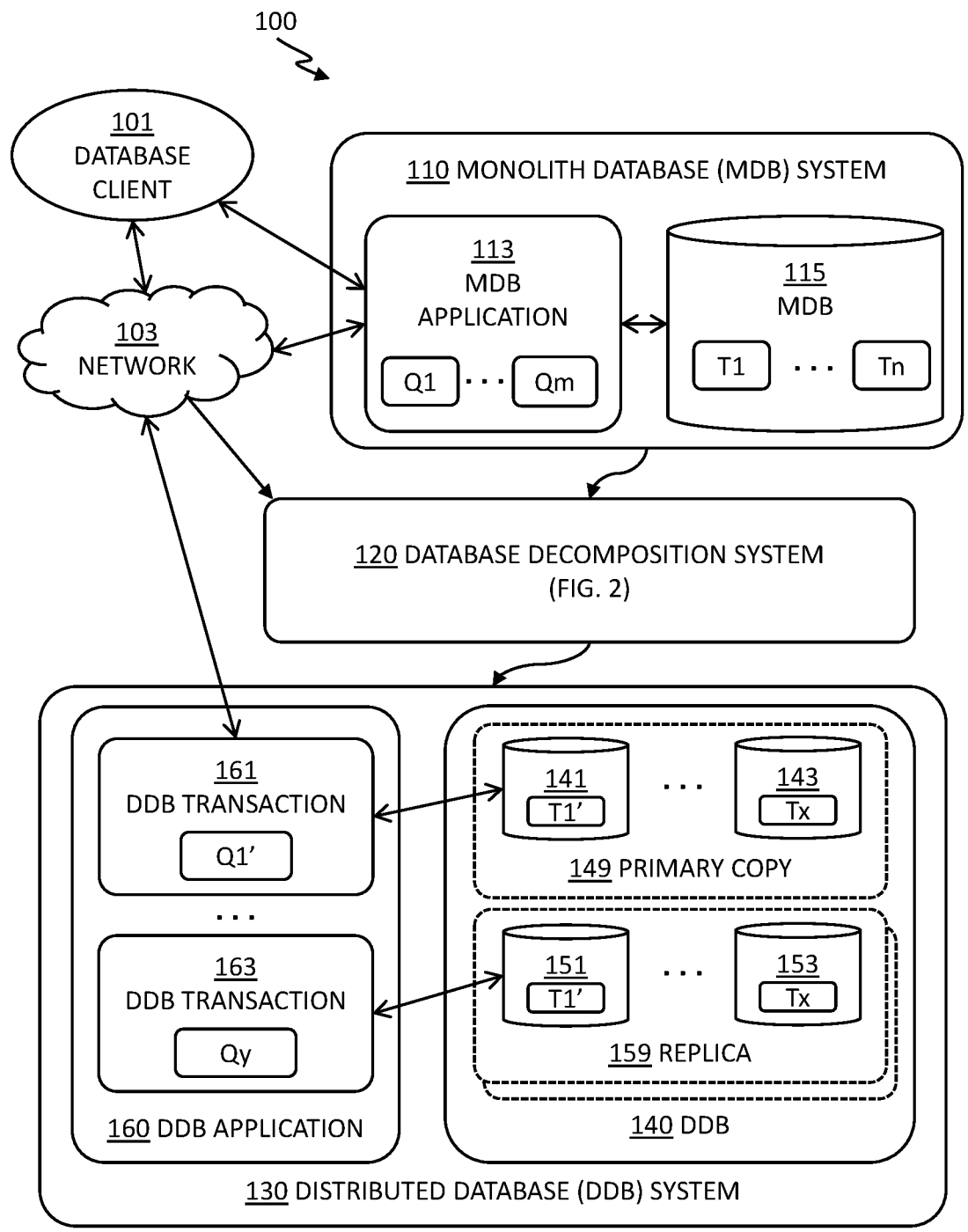
FIG. 1 depicts a system for transforming a database architecture from monolithic to distributed, in accordance with one or more embodiments set forth herein.

FIG. 1 depicts a system 100 for transforming a database architecture from monolithic to distributed, in accordance with one or more embodiments set forth herein.

As noted above, in rapidly evolving IT environments based on various new computing paradigms such as cloud computing and ubiquitous computing, organizations regularly put effort to modernize legacy IT systems to stay compatible with evolving IT environment outside of the organizations, or to take advantage of new technologies in terms of cost and performance. In modernizing the legacy IT systems, organizations operating the IT systems have various transition technology/tools available at hand for legacy applications to allow dynamic and agile development of applications. A cloud native architecture takes a modular approach in building, running, and updating software application by use of a suite of cloud-based microservices offered by cloud service providers.

However, regarding database of legacy IT systems that provides persistent storage to the organization, no tools or solutions to modernize conventional database management system are available. The legacy database management systems are typically in monolithic architecture, with conventional database management system for standard queries. As database technology is also in rapid evolution as shown in cloud-based database implementation and services such as cloud database, Database-as-a-Service (DBaaS), distributed database, as well as high availability-high performance database system utilizing in-memory data structure, it would be desirable for the organizations to modernize legacy monolithic database systems to take advantage of the evolving technologies to improve performance and cost effectiveness. The legacy monolithic database systems are central to business of the organizations and its framework needs to be maintained to provide continuity in the business of the organizations. Accordingly, a solution to modernize the monolithic database based on evolved database technologies such as a cloud database, in-memory data storage, and/or distributed database technology for performance improvement would also need to provide the same data service as in the monolithic database with the same data integrity.

Certain database transaction paradigm such as a Command and Query Responsibility Segregation (CQRS) pattern and a Simple API for Grid Application (SAGA) pattern in emerging database technologies have challenges regarding consistency amongst multiple instances of a data object as the multiple instances of the data object can exist concurrently for parallel processing, high-availability, and performance improvement by reducing wait time when multiple transactions are to be performed on the data object. In legacy database systems, transactions have properties of atomicity, consistency, isolation, and durability (ACID), in which a read operation of a data object will always retrieve the latest update to the data object. In contrast, because distributed database and other multi-cloud based database utilizes multiple replica of the same database for performance and availability, instead of waiting for the data object to be synchronized with any latest updates, a paradigm of "eventual consistency" in which changes to content of the multiple-instance database are propagated to all replicas of the distributed database eventually, typically within milliseconds, which leaves a possibility for certain queries for a changed data object might not return the latest update until the propagation is complete. Regardless of such consistency challenge with the distributed database systems, it is desirable to modernize legacy monolith databases to benefit from cloud economy of scale or Database-as-a-Service (DBaaS), taking advantage of emerging technology and changed IT system environment, as noted earlier.

The system 100 includes a monolith database (MDB) system 110, a database decomposition system 120, and a distributed database system 130. The database decomposition system 120 produces the distributed database system 130 based on the information obtained from the MDB system 110 and other data sources via a digital communication network 103.

A database client 101 indicates an organization that owns and operates the MDB system 110 as a part of its legacy IT system. The database client 101 is often a small to medium-size enterprise (SME). The database client 101 accesses and operates directly or indirectly via the digital communication network 103 with the MDB system 110, based on physical location of the MDB system 110. The database client 101 accesses the distributed database system 130 via the digital communication network 103.

The MDB system 110 includes an MDB 115 and an MDB application 113. As noted, the MDB system 110 is typically of monolithic and relational architecture, indicating that the MDB 115 includes all tables T1 . . . Tn, wherein n is a number of tables in the MDB 115, and that the MDB application 113 accesses the MDB 115 with transactions with a combination of queries Q1 . . . Qm, wherein m is a number of queries available in the MDB application 113. The MDB application 113 represents data service operations in a monolithic database management system corresponding to the MDB 115, which the database decomposition system 120 processes for the distributed database system 130.

The distributed database system 130 includes a distributed database (DDB) 140 and a DDB application 160. The DDB 140 includes a primary copy 149 and one or more replica 159. The DDB 140 is logically a single database, in which the primary copy 149 and the replica 159, indicating copies of the primary copy 149 in plurality, facilitate concurrent operations on a same data object on multiple instances of the same data object stored in the DDB 140, fault tolerance with continuous data backup, and other advantages inherent with a distributed database architecture. Although data objects of the DDB 140 are often referred to as a "table", the DDB 140 may not be of a tabular-relational database architecture as in the MDB 115 but a polyglot-persistent architecture as in NoSQL systems which supports relational database functionalities of the MDB 115. The DDB system 130 also includes a DDB application 160, which includes a plurality of DDB transactions 161, 163.

The database decomposition system 120 presented herein concerns decomposition of the MDB 115 into the DDB 140 and transformation of corresponding data services, from the MDB application 113 to the DDB application 160. In decomposing the MDB 115 into the DDB 140, the database decomposition system 120 performs various modeling by machine learning based on information collected across a subject domain of the database client 101. The subject domain of the database client 101 can be a field of industry or a type of business conducted by the database client 101. The database decomposition system 120 builds intermediary data corpora to verify the subject domain and terms of the subject domain to improve confidence in analyzing data objects in the MDB 115 to accurately identify entities represented in the DDB 140. The database decomposition system 120 performs functional modeling in decomposing the data services and data entities of the MDB system 110 into the DDB system 130, to achieve the functionalities of the MDB system 110 with the DDB system 130 for the database client 101, as the DDB system 130 will ultimately replace the MDB system 110 after deployment. The database decomposition system 120 also performs modeling for a preconfigured number of non-functional requirements (NFR) as requested by the database client 101, which include the aspects of performance, scalability, and availability in embodiments presented herein. Based on the results of the NFR modeling, the database decomposition system 120 optimizes respective granularities of data objects of the DDB 140 according to patterns of frequent data services required by the database client 101. Accordingly, based on transaction heuristics of the MDB system 110, the performance, scalability, and availability of the DDB system 130 would be improved over the MDB system 110. In this specification, nodes 141, 143, 151, 153 of the DDB 140 is a unit of access to the DDB 140, operates as a single logical database. Multiple machines and data servers across multiple locations/data centers can participate in the DDB 140 by hosting certain nodes of the DDB 140. Details of the database decomposition system 120 are presented and indexed in FIG. 2 and corresponding description.

The primary copy 149 of the DDB 140 includes the nodes 141, 143 having respective tables T1' . . . Tx, wherein x is a number of all uniquely identified tables in the DDB 140. Multiple instances of a same table with a same table identifier are present in numerous copies, including the primary copy 149 and the replica 159, of the DDB 140. Each of the replica 159 also includes the nodes 151, 153 storing respectively corresponding tables T1' . . . Tx. The collection of tables T1' . . . Tx in the DDB 140 is functionally equivalent to the tables T1 . . . Tn represented in the MDB 115, as the database decomposition system 120 decomposed the MDB 115 in building the DDB 140. However, based on the database architecture implementing the DDB 140 the tables T1' . . . Tx in the nodes 141, 143 of the primary copy 149 and the nodes 151, 153 of each of the replica 159 are not the same tables T1 . . . Tn of the MDB 115, as the granularities and data objects recorded in respective tables would have been significantly changed during the decomposition. The DDB transactions 161, 163, accesses the DDB 140 with transactions including one of available queries Q1' . . . Qy, wherein y is a number of queries available in the DDB application 160 to access one node of the DDB 140 per transaction. Similarly with case of the MDB application 113, the DDB application 160 represents data service operations in a distributed database management system of the DDB 140. The collection of the queries Q1' Qy represented in the DDB transactions 161, 163 are functionally equivalent to the queries Q1 . . . Qm of the MDB application 113. The characters m, n, x, and y respectively represent positive integers that are unlikely to be equal to one another.

In certain embodiments of the present invention, the database client 101 is a typical SME in the process of developing a proprietary enterprise resource planning (ERP) system currently running on the monolith database system 110. An ERP is a suite of integrated business management software to collect, store, manage, and interpret data from business activities by the database client 101. The ERP system often operates in real time as mediated by various information technology. The ERP system is currently implemented as a local storage for the monolith database 115, which will be transformed into the distributed database 140 that may be implemented based on cloud services and a replica DDB 150 on a second datacenter for disaster recovery and/or data backup.

Figure 2:
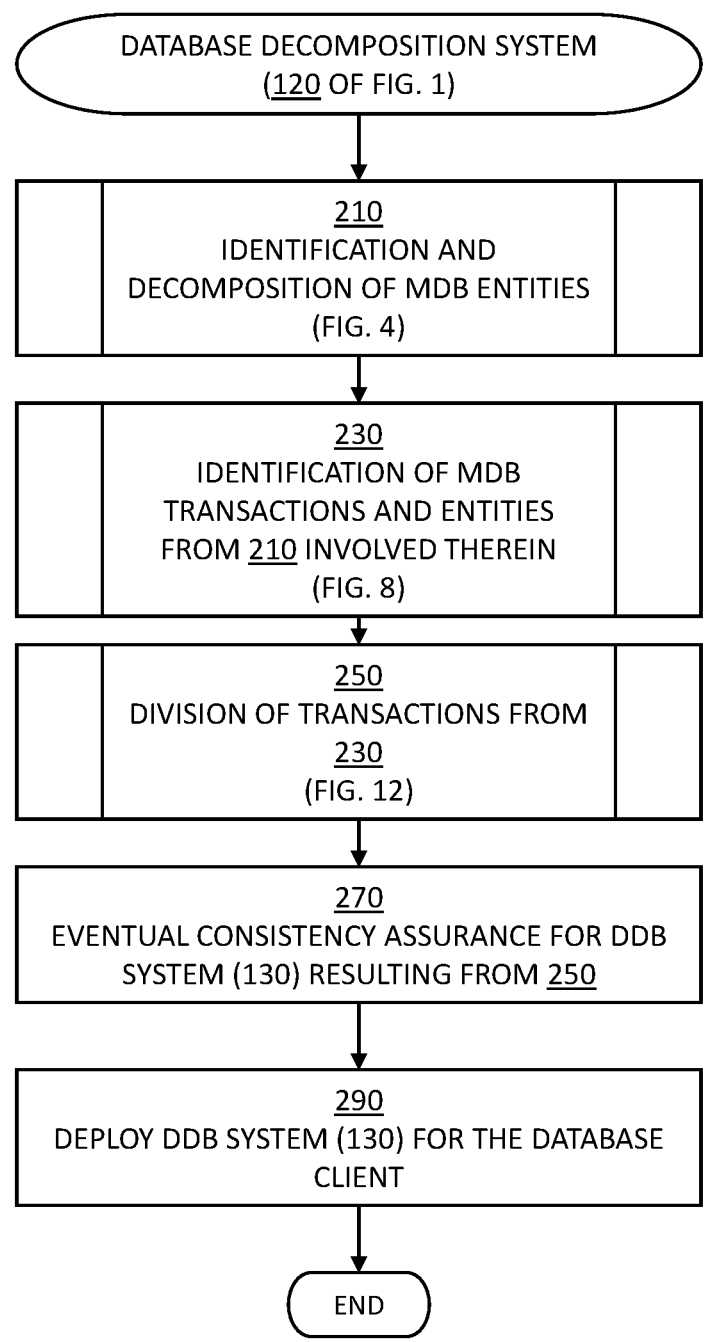
FIG. 2 depicts a flowchart of operations performed by the database decomposition system of FIG. 1, in accordance with one or more embodiments set forth herein.

FIG. 2 depicts a flowchart 200 of operations performed by the database decomposition system 120 of FIG. 1, in accordance with one or more embodiments set forth herein.

The flowchart 200 of the database decomposition system 120 shows a top-level process in decomposing the monolith database system 110 to the distributed database system 130 that can perform functionalities of the monolith database system 110 with improved non-functional characteristics such as performance, scalability, and availability. The database decomposition system 120 performs modeling of entities represented in the monolith database 115 to generate entities for the distributed database 140 by reverse engineering, machine learning modeling, numerical and natural language analysis, and various cross verification with datasets generated for the subject domain for the monolith database 115 and the distributed database 140. The database decomposition system 120 then establishes the distributed database transactions 161, 163 by dividing transactions of the monolith database application 113 for unit query operation and single entity operation. The database decomposition system 120 prepares entities used in the transactions of the monolith database application 113 for the distributed database 140 based on various optimization modeling to take full advantage of the distributed database architecture. The database decomposition system 120 tests the distributed database system 130 for eventual consistency and deploys for use in place of the monolith database system 110.

In block 210, the database decomposition system 120 identifies and decomposes entities of the MDB 115 and generates a metadata table of the MDB 115 to select candidate entities to be represented in the DDB 140. In this specification, term "entity" indicates an object of interest in data models of the databases 115, 140, and term "table" indicates a unit of accessible data object in both the MDB 115 and the DDB 140. Each entity may have properties referred to as attributes, which are represented in columns or fields in a table in relational databases. In cases where the abstract data model and implementation in the databases 115, 140 do not need to be differentiated, terms "entity" and "table" can be used interchangeably. Details of respective data components and data flow amongst the data components in block 210 is presented in FIG. 3 and corresponding description. Detailed operations of as performed by the database decomposition system 120 in block 210 are presented in FIG. 4 and corresponding description. Then, database decomposition system 120 proceeds with block 230.

Figure 3:
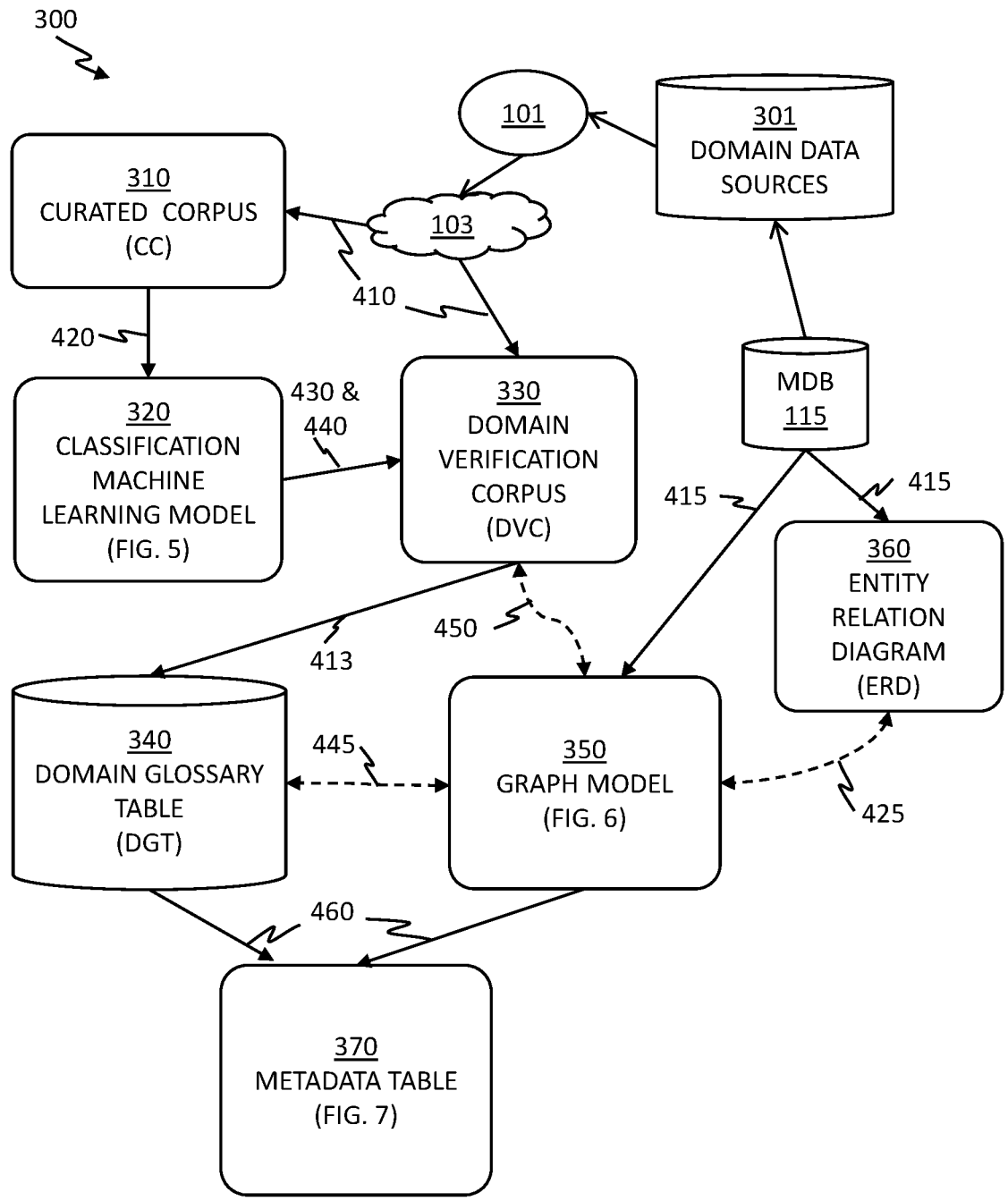
FIG. 3 depicts a dataflow diagram for data components generated by the database decomposition system in block 210 of FIG. 2, in accordance with one or more embodiments set forth herein.
Figure 4:
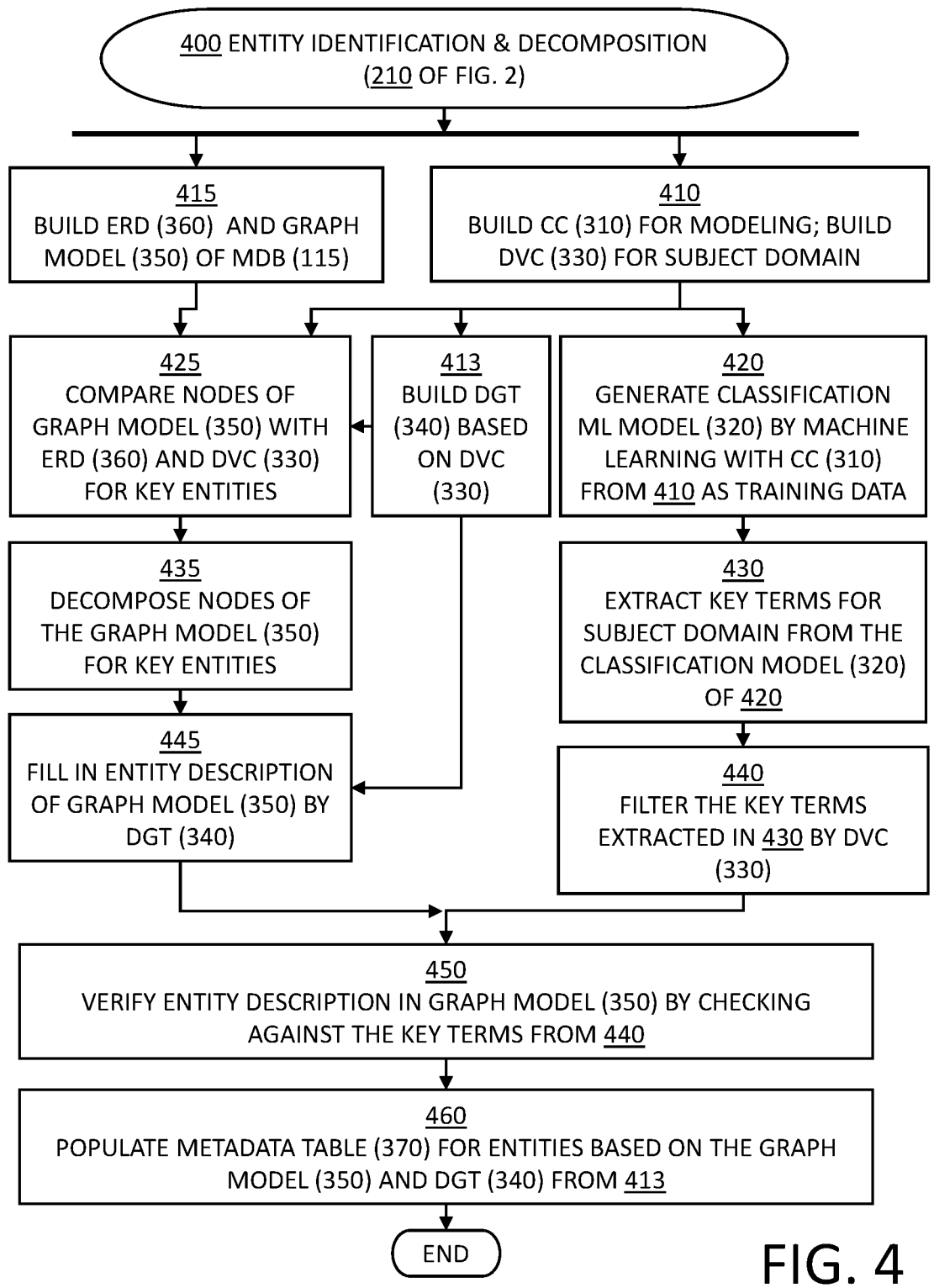
FIG. 4 depicts a flowchart of operations performed by the database decomposition system in block 210 of FIG. 2, in accordance with one or more embodiments set forth herein.

In performing block 210, the database decomposition system 120 generates and operates upon various data components presented in FIG. 3. FIG. 3 depicts a data flow diagram 300 of data flows and interactions amongst data components generated by the database decomposition system 120 in block 210. In block 210, the database decomposition system 120 generates an output of a metadata table of the MDB 115 as being prepared for the DDB 140, as the entities in use by the MDB system 110 should also be supported in the DDB system 130 to replace functionalities of the MDB system 110. The data components generated by the database decomposition system 120 in block 210 includes: a curated corpus (CC) 310 and a domain verification corpus (DVC) 330, respectively based on the information collected from domain data sources 301; a classification machine learning model 320 based on the CC 310 as training data; a domain glossary table (DGT) 340 extracted from the DVC 330; an entity relation diagram (ERD) 360 and a graph model 350, respectively based on entities and relations represented in the MDB 115; and a metadata table 370 including entities of the MDB 115 selected from the graph model 350 as being populated with attributes based on information of the DGT 340. Connectors amongst the data components of the data flow diagram 300 are identified with respective block numbers in FIG. 4 that operate on the data components of FIG. 3. As noted, FIG. 4 presents detailed operations of block 210 of FIG. 2 in identifying and decomposing entities of the MDB 115 to generate the metadata table 370. An example of the classification machine learning model 320 is presented in FIG. 5 and corresponding description. An example of the graph model 350 is presented in FIG. 6 and corresponding description. An example of the metadata table 370 is presented in FIG. 7 and corresponding description.

In block 230, the database decomposition system 120 identifies transactions frequently used in the MDB system 100 and entities of the MDB 140 involved in the frequently used transactions. The database decomposition system 120 transforms the frequently used transactions as being identified and the entities involved in the frequently used transactions for the DDB system 130. The database decomposition system 120 uses systems tables and transaction logs of the MDB 115 to rank and map transactions performed on the MDB 115 by the MDB application 113, as being broken down to unit queries, and entities involved therein. The database decomposition system 120 further updates the metadata table 370 resulting from block 210 based on transaction heuristics data collected from operations of the MDB system 110. The database decomposition system 120 completes the transaction-entity mapping with tables of the metadata table 370 and further breaks down the tables to optimize performance of the DDB system 130 when any candidate is present in the tables. As the MDB 115 would be transformed into the DDB 140, entities represented in the metadata table 370 of the MDB 116 would be represented in the DDB 140 in a manner that any transactions and entities present in the MDB system 110 can be represented and performed in the DDB system 130 with functional equivalency, prior to any further improvements and optimization based on various preconfigured non-functional requirements. Details of operations of block 230 of FIG. 2 as performed by the database decomposition system 120 are presented in FIGS. 8-9 and corresponding descriptions. Then, database decomposition system 120 proceeds with block 250.

In block 250, the database decomposition system 120 divides the transactions resulting from block 230 to the DDB transactions 161, 163 to have each DDB transaction involve one entity/table in the DDB 140 in executing the DDB transaction. The database decomposition system 120 further granularize the tables/entities in the DDB 140 to optimize scalability and availability of the DDB 140 per non-functional requirements (NFR) modeling by use of silhouette clustering. The database decomposition system 120 completes building the DDB system 130, which is functionally equivalent to the MDB system 110 with improved performance, scalability, and availability. Details of operations of block 250 of FIG. 2 as performed by the database decomposition system 120 are presented in FIG. 12 and corresponding description. At the conclusion of block 250, the DDB system 130 is completed with the DDB 140 and the DDB application 160 with the DDB transactions 161, 163. Then, database decomposition system 120 proceeds with block 270.

In certain embodiments of the present invention, the database decomposition system 120 performs NFR modeling based on silhouette criteria in blocks 230 and 250, as noted above. Silhouette refers to a method of interpretation and validation of consistency within clusters of data. Silhouette technique provides a graphical representation of how well each object has been classified. The silhouette value s(i) of a data point i, for a positive integer i, is a measure of how similar an object represented by the data point i is to other objects in its own cluster compared to other clusters. If the object is similar to other objects in its own cluster, the cluster is cohesive as the object is properly classified into the current cluster. If the object is more dissimilar to other objects in its own cluster than objects in other clusters, then the object should be separated from its own cluster, either by forming a new cluster or by moving to other cluster that the object would be more cohesive within. The range of silhouette value for a data point i is $-1 \leq s(i) \leq 1$, where s(i) close to one (1) indicates that the data point i is configured for a proper cluster as being cohesive with other data points in its own cluster, and s(i) close to minus one (−1) indicates that the data point i is not properly configured for a cluster as being more similar to data points in neighboring clusters. If there are too many or too few clusters, as may occur when a poor choice of k, for a positive integer k, is used in the clustering algorithm such as k-means clustering algorithm, some of the clusters will typically display much narrower silhouettes than the rest. Thus silhouette plots and means may be used to determine the natural number of clusters within a dataset. Based on the silhouette value, a silhouette coefficient for the maximum value of the mean silhouette value s(i) over all data of the entire dataset is denoted as $$SC = \max_{k} \tilde{s}(k),$$

where $\tilde{s}(k)$ represents the mean s(i) over all data point i of the entire dataset for a specific number of clusters k.

For the NFR modeling in blocks 230 and 250, the database decomposition system 120 separates a table into two or more tables when a specific attribute in the table presents dissimilar characteristics within the table. As noted above, a certain instance dissimilar from the rest of a dataset reduces the silhouette value for the dataset, and the database decomposition system 120 separates the dataset to improve cohesion within clusters, as represented by a silhouette value for each cluster of the dataset.

For performance modeling, the database decomposition system 120 compares frequencies and durations of query execution time amongst the records in the table and separates any record, i.e., a row in the table, that is dissimilar to the rest of the records in the table into a different table. For scalability modeling, the database decomposition system 120 compares columns of the table and separates any column, representing a particular attribute in the table that is dissimilar to the rest of the columns in the table into a different table. For availability modeling, the database decomposition system 120 compares values of the table and separates any value that is dissimilar to the rest of the values in the table into a different table. The database decomposition system 120 can also adjust the level of dissimilarity for a particular attribute by assigning to a dissimilar data point an additional distance from a current cluster such that entities with the particular attribute with distance adjustment would be more prone to form a separate cluster with more cohesive entities rather than being mixed with other entities that are dissimilar in terms of the particular attribute modeled in a larger cluster.

In block 270, the database decomposition system 120 checks how eventual consistency is to be assured for the DDB transactions 161, 163 performed on the DDB 140 resulting from block 250. In certain embodiments, the database decomposition system 120 is configured with a certain threshold time limit to assure eventual consistency of the DDB system 130, by which all nodes of the DDB 140 are to be synchronized. In certain embodiments, the database decomposition system 120 measures a plurality of delays until all nodes of the DDB 140 achieve eventual consistency for numerous preconfigured patterns of DDB transactions and makes a record of the delays until the eventual consistency available for deployment of the DDB 140 in block 290 such that the eventual consistency delay would be taken into account in executing the DDB transactions. Then, database decomposition system 120 proceeds with block 290.

In certain embodiments of the present invention, the database decomposition system 120 forms in a preconfigured number of copies of the replica 159 of the DDB 140, to ensure high availability of the DDB system 130 such that common queries of create, read, update, and delete (CRUD) are to be performed concurrently on the same data object by use of respective copies stored in the DDB 140, including the primary copy 149 and the replicas 159. In other embodiments of the present invention, the database decomposition system 120 forms the replica 159 of the DDB 140 in accordance with the Command and Query Responsibility Segregation (CQRS) design pattern that separates read and update operations for respective copies of the DDB 140. For generating a new copy of the replica 159 of the DDB 140, the database decomposition system 120 may utilize currently available database replication tools such as Power-Exchange or Oracle Golden Gate. As a consequence of having multiple instances of single entity across many copies of the distribute database for high availability, while a read query and a write query on the single entity can be simultaneously performed, multiple instances across the copies of the distributed database of the single entity would have different values immediately after queries and will be eventually consistent with a certain delay, which is referred to as eventual consistency in a distributed database architecture. In the same embodiments of the present invention, the database decomposition system 120 implements critical transactions mandating immediate consistency with multiple DDB transactions triggering immediate synchronization across the instances of the DDB 140, or with a DDB transaction embedding a system call to synchronize all instances of single entity across the copies of the DDB 140.

In certain embodiments of the present invention, the primary copy 149 and the replica 159 of the DDB 140 can be located in separate data centers to provide certain level of fault tolerance in emergency backup/disaster recovery, in addition to high availability and operational continuity without data loss. The database decomposition system 120 facilitates a system call to switch between data centers or to designate a particular data center for accessing an entity of the DDB 140 or to update the primary copy 149 of the DDB 140 immediately when any of the replica 159 of the DDB 140 is updated for an entity frequently accessed from the primary copy of the DDB 140. Further, because the entities in the DDB 140 are divided to minimal key entities with similar characteristics and because the DDB transactions 161, 163 are decomposed to unit queries, the performance of the DDB system 130 regarding response time would be even and faster across operations without no long operations.

In block 290, the database decomposition system 120 deploys the DDB system 130 for the database client 101 to replace the MDB system 110 with improved performance, scalability, and availability by NFR modeling of the DDB 140. Then, database decomposition system 120 terminates processing or loops back to block 210 per configuration set for operations of the database decomposition system 120.

The database decomposition system 120 as described in this specification provides a framework to transform monolith database systems to distributed database systems with more granular data object and more modular transactions than in the monolith database system 110. The database decomposition system 120 generates the distributed database system 130 to take advantage of cloud native architecture and/or serverless architecture trends in evolving computing technology for the distributed database 140 by breaking down the access units of the monolith database 115 into micro-entities in the distributed database 140 that corresponds to distributed database transactions 161, 163 often implemented as microservices. The database decomposition system 120 preserves existing functionalities of the monolith database 115 partially by maintaining entities and relations of the monolith database 115. The minimal granularity of entities in the distributed database 140 improves performance of the distributed database 140 by facilitating multifold concurrency in performing distributed transactions without waiting for an entity to be available while being locked out by other long operations, which is common in monolith database transactions with many queries and large access unit entities. The data decomposition system 120 generates the distributed database system 130 that provides distributed transactions functionally equivalent to monolith applications 113 and distributed entities that are in the same entity life cycle state as in the entities from the monolith database 115.

Conventional IT systems used for modernizing database systems are mostly focused on transforming monolith database operations based on relational database into microservices and cloud-based services and transactions without a distributed database architecture corresponding to the microservices and/or distributed transactions. The database decomposition system 120 facilitates transformation of a database architecture from a monolithic-relational database to a distributed or non-relational database while assuring functional equivalency of the monolith architecture for business continuity but still improves performance, scalability, and availability by leveraging evolved databased/computing technology not compatible with legacy monolith databases systems. By employing reverse engineering of the legacy database to analyze entity-relation of the monolith database, by machine learning modeling and analysis for classifying terms of the subject domain, by use of graph modeling, extensive data collection and compilation of subject domain data, as well as non-functional modeling to improve performance, scalability, and availability of the distributed database 140, the databased decomposition system 120 provides advantages in cost and effort over designing a new distributed database system to substitute a legacy monolith database while facilitating business continuity and functional equivalency with improved performance, scalability, and availability, leveraged by high performance, high speed, and low-maintenance evolving technologies that are only compatible with the distributed database system 130.

In the same embodiments of the present invention as the ERP modernization to the DDB system 130, the ERP application has two dataflows for activities of the database client 101. A first dataflow in the ERP begins at a process PURCHASE_INQUIRY to a process PURCHASE_ORDER, then, to a process ACCOUNT_PAYABLE. A second dataflow in the ERP begins at a process SALES_INQUIRY, to a process SALES_ORDER, to a process SALES_INVOICE, then to a process ACCOUNT_RECEIVABLE. The database decomposition system 120 examines the monolith database 115 implementing the ERP application and discovers three (3) tables of PURCHASE, SALES, and FINANCE in the monolith database 115 for the processes of the two dataflows. All read/write operations of processes PURCHASE_INQUIRY, PURCHASE_ORDER, and PURCHASE_STATUS of the ERP application will be performed on the PURCHASE table of the monolith database 115. Similarly, all read/write operations of processes SALES_INQUIRY, SALES_ORDER, and SALES_INVOICE, and SALES_STATUS of the ERP application will be performed on the SALES table of the monolith database 115. Similarly, all read/write operations of processes ACCOUNT_PAYABLE and ACCOUNT_RECEIVABLE of the ERP application will be performed on the FINANCE table of the monolith database 115. The monolith database 115 with the tables PURCHASE, SALES, and FINANCE will suffer long wait or even a deadlock in executing the two dataflows of the ERP application, at least because both the first dataflow beginning with the process PURCHASE_INQUIRY and the second dataflow beginning with the process SALES_INQUIRY would access the table FINANCE, so the access will be congested and no process in the respective dataflows cannot be performed concurrently as the tables PURCHASE and SALES in the monolith database 115 should be accessed in order according to the processes in the ERP applications regardless of data dependency. The database decomposition system 120 will have nodes/tables of PURCHASE_INQUIRY, PURCHASE_ORDER, and ACCOUNT_PAYABLE in the distributed database 140 for the first dataflow of the ERP application, as well as nodes/tables of SALES_INQUIRY, SALES_ORDER, SALES_INVOICE, and ACCOUNT_RECEIVABLE in the distributed database 140 for the second dataflow of the ERP application as completing the transformation of the monolith database 115, based on dividing the entities per transaction as shown in block 250. By use of the distributed database 140, the ERP application can perform the two dataflows concurrently without any delay in accessing the distributed database 140, in contrast with the monolith database 115. Also, the ERP application can perform multiple threads of the two dataflows upon any number of the replica distributed database 150 by implementing CQRS pattern for the distributed database 140, which allows concurrent execution of a read query from the replica 159 of the DDB 140 and a write command to the primary copy 149 of the DDB 140 for a same table. The transactions of the ERP application will be decomposed to produce the distributed database transactions 161, 163 by splitting per unit queries and divided further for single entity-single operation according to database use statistics of the ERP application in the monolith database 115. The database decomposition system 120 further separates nodes/tables of the DDB 140 into more tables and/or nodes to optimize performance, scalability, and availability of the DDB 140 based on silhouette clustering, in supporting functionalities of the ERP application.

FIG. 3 depicts a dataflow diagram 300 for data components generated by the database decomposition system in block 210 of FIG. 2, in accordance with one or more embodiments set forth herein.

As noted above in block 210 of FIG. 2, the database decomposition system 120 generates various data components in identifying and decomposing entities of the MDB 115, which include: the curated corpus (CC) 310 and the domain verification corpus (DVC) 330, respectively based on the information collected from domain data sources 301; the classification machine learning model 320 based on the CC 310 as training data; the domain glossary table (DGT) 340 extracted from the DVC 330; the entity-relation diagram (ERD) 360 based on entities and relations represented in the MDB 115 and the graph model 350; and the metadata table 370 including entities of the MDB 115 selected from the graph model 350 as being populated with attributes based on information of the DGT 340.

The curated corpus 310 is a training dataset for the classification machine learning model 320. The database decomposition system 120 collects the CC 310 from various domain data sources 301 and the database client 101 via the network 103. The domain data sources 301 indicates sources of information available in a subject domain, referring to a field of business or industry of the database client 101, relevant to database designs, data service and other aspects of operations in the subject domain, as being currently serviced by the MDB system 110. The domain data sources 301 include, but are not limited to, entity maps existing in the subject domain, documentation on the entity maps based on requirements of data services in the subject domain, database design documents in the domain including architecture impact document (AID) identifying changes to existing architecture corresponding to changes in the functional requirements in the domain, a solution architecture and artifacts, column definitions in domain databases, incident tickets for common problems, technical documents, and operation data and process flows for database systems in the domain. A solution architecture is a description of an operation required for the MDB 115 and/or the DDB 140 and how an information system/information technology (IS/IT) will support the operation. A solution architecture is typically applicable to a single project, the transformation of the MDB 115 to the DDB 140 herein, to assist with specifying a high-level specification, IT system requirements, and a portfolio of implementation tasks necessary for the project.

The database decomposition system 120 extract key terms from the domain data sources 301 based on frequency and context of use in the domain data sources 301, by use of natural language processing (NLP) cognitive analytics tools. The database decomposition system 120 identifies the subject domain based on the key terms as being extracted from the domain data sources 301. In this specification, terms "subject domain" and "domain" are used interchangeably to indicate a field of business or an industry of the database client 101, in which the MDB system 110 is currently deployed.

The database decomposition system 120 builds the classification machine learning model 320 based on the curated corpus 310 as training data. In certain embodiments of the present invention, the database decomposition system 120 extracts entities from the curated corpus 310 by use of Bidirectional Encoder Representation from Transformer (BERT) method, which selects an entity fits in a black box where no information on the subject domain or features are initially known.

FIG. 5 depicts an example 500 of the classification machine learning model 320, in accordance with one or more embodiments set forth herein. The database decomposition system 120 has selected five (5) entities from the curated corpus 310 collected for the database client 101 that is an SME with an unspecified subject domain. The curated corpus 310 had been built based on data collected from the domain data sources 301 including the monolith database 115, as screened and authorized by the database client 101 as noted above. The example 500 extracted entities Purchase 510, Inquiry 520, Estimates 530, Orders 540, and Invoices 550. Respective numbers of appearances of the term and/or a preconfigured set of substantially similar terms are also represented for each of the entities 510, 520, 530, 540, and 550, indicating, for example, term "Purchase" or preconfigured synonyms of "Purchase" had appeared twenty (20) times in the curated corpus 310, or term "Invoice" or preconfigured synonyms of "invoice" appeared eighty (80) times in the curated corpus 310.

The domain verification corpus 330 is a collection of data related to the subject domain of the monolith database 115 as well as the distributed database 140, which is initially unknown to the database decomposition system 120. The domain verification corpus 330 includes, but is not limited to, the Common Information Model (CIM) that is a standard for Web-Based Enterprise Management (WBEM), any other industry standard for the field of business of the database client 101, various published web-based service Application Programming Interfaces (APIs), schema, attributes, subject areas, business models and other available standards, classes, and statistical data such as word count vectors, term frequency—inverse document frequency (tf-idf) vectors, and keywords and features analyzed per NLP analysis tools that may be represented in the DDB 140 as an entity. The domain verification corpus 330 is a dataset used to extract information related to the subject domain of the MDB 115 and the DDB 140, while the CC 310 is more focused on database architecture, design, and artifacts on the MDB 115. The CC 310 and the domain verification corpus 330 may overlap regarding the domain specific information, which would be mapped into the graph model 350. As shown in the example 500 of the classification machine learning model 320, the curated corpus 310 may include general information applicable for any database client 101 as a business organization such as "purchase" and "sales". The domain verification corpus 330 concerns the subject domain, that is the industry/field of business of the database client 101, of the MDB 115 and the DDB 140 to transform the MDB 115 into the DDB 140 with terms most suitable for the subject domain. For example, the database client 101 who is an IT company would have need the DDB 140 different from another database client who is an automobile manufacturer or a clothing maker.

The database decomposition system 120 creates the domain glossary table 340 based on information extracted from the domain verification corpus 330. The domain glossary table 340 stores information related to the subject domain of the MDB 115, that is, the field of business or industry of the database client 101, such as domain applications, various types of database schemas common in the industry, common subject areas, and any other terms and definitions common to business model/practice for the subject domain. The database decomposition system 120 utilizes the domain glossary table 340 in populating certain data of the metadata table 370 of the MDB 115.

The database decomposition system 120 creates the graph model 350 to minimize the number of entities to be presented as a node for the DDB 140, while providing the functionalities equivalent to the MDB 115. The database decomposition system 120 analyzes each table of the MDB 115 for a sign indicating if a table is an intermediate table or an intersection table as being presented in the MDB 115, by examining columns, specifically for primary keys, surrogate keys, and/or foreign keys. The database decomposition system 120 subsequently substitutes a referential relation represented in the intermediate/intersection tables with an edge that represents the same referential relation in the graph model 350, instead of creating any nodes for the intermediate/intersection tables in the graph model 350. Accordingly, the graph model 350 would result in a minimal number of nodes, respective to each key entity of the MDB 115, with no redundancy.

In certain embodiments of the present invention, the database decomposition system 120 implements the graph model 350 based on link prediction and node classification model based on graph convolutional network. Accordingly, the database decomposition system 120 can classify nodes representing parent tables, dependencies amongst nodes, and nodes dependent/child table. Based on interrelation amongst the nodes in the graph model 350, the database decomposition system 120 determines closeness between a group of nodes in the graph model 350 based on the columns/values present in tables of the MDB 115 corresponding to the nodes in the group. The database decomposition system 120 may cluster certain group of nodes based on respective subject areas, and dependencies with other nodes in the graph model 350. For example, if the graph model 350 has nodes for Purchase Inquiry, Supplier, Products, and Estimates, because the nodes Supplier, Products, and Estimates would be ordinarily referenced from the node Purchase Inquiry in the graph model 350, the database decomposition system 120 may cluster together the nodes Supplier, Products, and Estimates, under the node Purchase Inquiry at a level above the nodes Supplier, Products, and Estimates within the graph model 350.

Figure 6:
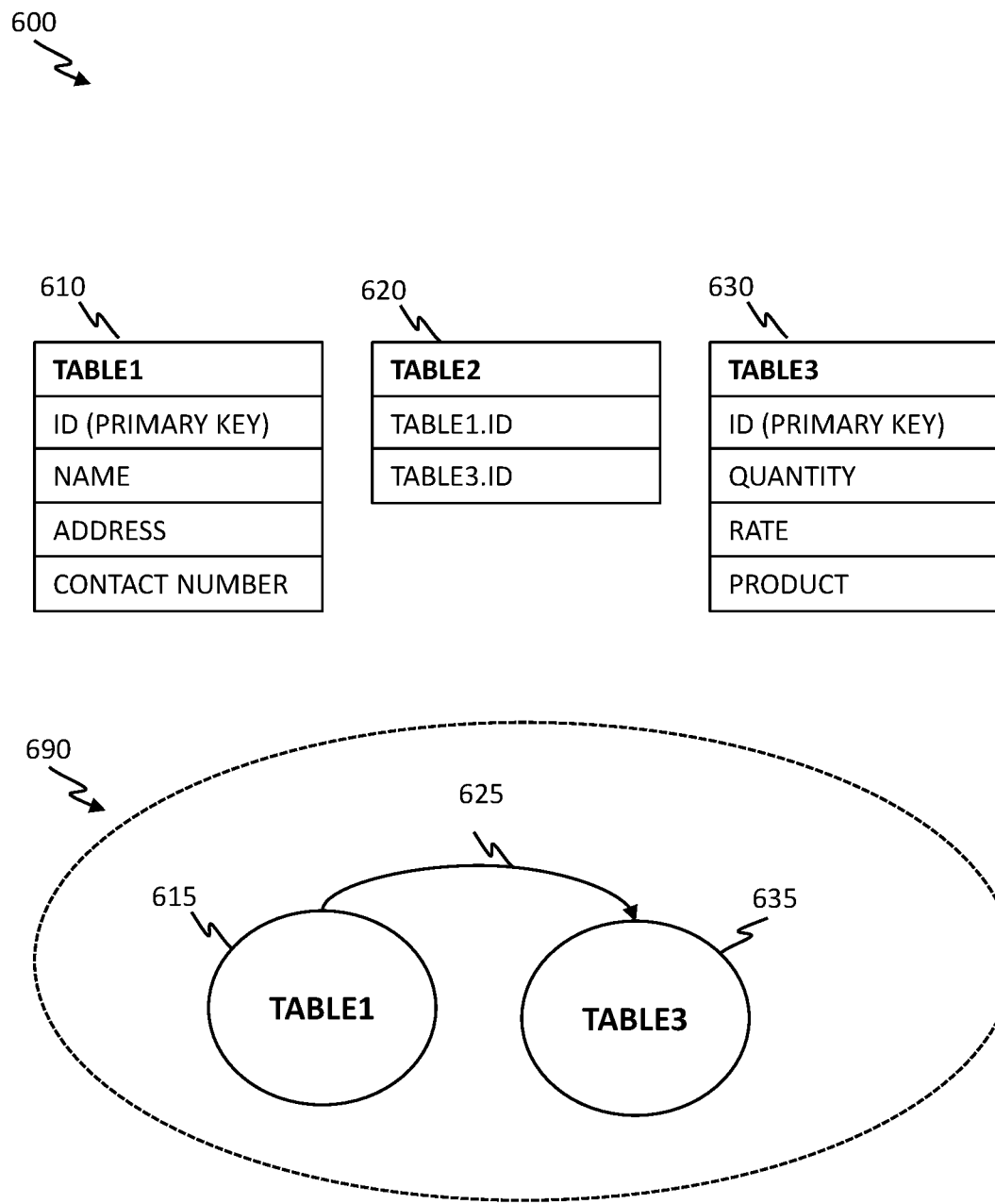
FIG. 6 depicts an example of the graph model of FIG. 3, in accordance with one or more embodiments set forth herein.

FIG. 6 presents an example 600 of node representation in the graph model 350, in accordance with one or more embodiments set forth herein. The example 600 includes tables Table1 610, Table2 620, and Table3 630, respectively representing a table in the MDB 115. The example 600 also includes a graph model 690 corresponding to the tables Table1 610, Table2 620, and Table3 630. The database decomposition system 120 analyzes the tables Table1 610, Table2 620, and Table3 630 of the MDB 115 and discovers a relation between two tables Table1 610 and Table3 630 by identifying the table Table2 620 as a reference table with foreign keys Table1.ID and Table3.ID to the two tables Table1 610 and Table3 630. The database decomposition system 120 concludes that the table Table2 620 is not an entity of the MDB 115 as having no primary key but only represents a referential relation between the two tables Table1 610 and Table3 630.

Based on the discovery from the analysis of the tables Table1 610, Table2 620, and Table3 630, the database decomposition system 120 represents the table Table1 610 of the MDB 116 as a node Table1 615 in the graph model 690, because the table Table1 610 had a primary key Table1.ID. Similarly, the database decomposition system 120 represents the table Table3 630 of the MDB 116 as a node Table3 635 in the graph model 690, because the table Table2 620 is not an entity of the MDB 115 as having no primary key but only represents a referential relation between the two tables Table1 610 and Table3 630. The database decomposition system 120 represents the table Table2 620 of the MDB 115 as an edge 625 coupling the Table1 node 615 and the Table3 node 635 in the graph model 690 to indicate the referential relation of the tables Table1 610 and Table3 630 in the MDB 115. The database decomposition system 120 implements the edge 625 representing the referential relation as an application code describing constraints and relationships for the nodes 615, 635 of the graph model 690, leveraging a new database architecture facilitating referential relations without any entity in a database. The edge 625 may be referred to as a code enforced constraints or as a code enforced reference.

The database decomposition system 120 also creates the entity-relation diagram 360 of the MDB 115 in block 415. The entity-relation diagram 360 is created by reverse engineering the MDB 115 to refine a data model for the DDB 140 based on the MDB 115. An entity-relation diagram of a relational database is commonly used to graphically represent high level functionality and data model for the data services required for the relational database. Entities and relations represented in the ERD 360 are applicable for all instances of the entity, or entity sets, recorded in the MDB 115 representing a specific knowledge, in a form of a data model, in the subject domain. The ERD 360 can also represent a business process model for operations required in operations of a particular subject domain. The ERD 360 generally represents an abstract data model of the MDB 115 that defines a data or information structure which can be implemented in a database, typically a relational database. Entities may have many attributes, or properties, including an identifier of the entity referred to as a primary key. It is presumed that the MDB 115 is implemented as a relational database, which represents an entity as a table in the relational database, represents one instance of an entity type as each row/record of the table, and represents an attribute/property for the entity type as each field/column in the table. In the same relational database implementation of the MDB 115, a relation between entities is typically implemented by storing a primary key of a first entity as a pointer in a table of a second entity having a relation with the first entity, which is referred to as a foreign key in the table of the second entity.

The database decomposition system 120 utilizes various reverse engineering tools such as ERWIN, TOAD, or Rational Data Architect, to obtain the ERD 360 based on the MDB 115. The database decomposition system 120 verifies that the graph model 350 represents the entities and relations of the MDB 115 by comparing the graph model 350 against the entity relation diagram 360. Also, the database decomposition system 120 identifies any requirements on data services by the database client 101 as represented by the graph model 350 based on cross comparison with the domain verification corpus 330 and the domain glossary table 340 that had not been represented in the ERD 360 for the MDB 115. The differences between the graph model 350 and the ERD 360 regarding entities and relations would represent data service requirements of the subject domain that had not been serviced by the MDB 115. The database decomposition system 120 communicates such differences between the graph model 350 and the ERD 360 to the database client 101 for review on whether to integrate the differences in the DDB 140. Any differences regarding the entities and relations from the ERD 360 in the graph model 350 would be kept in the graph model 350, ultimately for the DDB 140, if authorized by the database client 101.

The database decomposition system 120 generates the metadata table 370 based on the graph model 350 and the domain glossary table 340. The domain glossary table 340 provides context of transactions such as subject area or descriptions for nodes of the graph model 350 represented in the metadata table 370. Each row/record of the metadata table 370 is a table amongst all tables/entities in the graph model 350, and the metadata table 370 represents all entities being decomposed for the DDB 140. Attributes/columns in the metadata table 370 include table/entity name from the nodes of the graph model 350, description for each table/entity based on the domain glossary table 340, subject area for each table/entity based on the domain glossary table 340, and category for each table/entity of the graph model 350.

FIG. 7 presents an example 700 of the metadata table 370, in accordance with one or more embodiments set forth herein. In the example 700, the metadata table 370 includes five (5) attributes/columns of Table_ID 710, Table_Name 720, Description 730, Subject Area 740, and Category 750. The example 700 includes four (4) instances, indicating that there are four (4) tables T0001, T0002, T0004, and T0003, by the respective values of the Table_ID 710 column. The Subject Area 740 attribute/column is instantiated with four (4) kinds of values including "purchase module", "sales module", "finance", and "unknown", which corresponds to respective values of the Description 730 attribute/column. As noted above, the Description 730 column and the Subject Area 740 column are populated based on the domain glossary table 340, as representing the functionality or context of each entity/table in the subject domain are described in domain glossary table 340 based on business model and other related information of the subject domain. For the table in the fourth row identified as "T0003", the Table_Name 720 column has value "ETL RUN CTRL", the Description 730 column has value "A table to record ETL Interface execution timestamp.", the Subject Area 740 column has value "Unknown", and the Category 750 column has value "Operational Table". "ETL" stands for "extract, transform, load", indicating a general procedure of data replication into a destination with a context different from a source. As "ETL Interface" is more about the technical aspect of the database rather than about a context of operation in the subject domain, the database decomposition system 120 may not have any value for the Subject Area 740 column value corresponding to "ETL Interface" in the Description 730 column value specified in the domain glossary table 340, so the database decomposition system 120 populated the for Subject Area 740 column as "Unknown". The Category 750 column value "Operational Table" is the same for all tables in the example 700, as the database decomposition system 120 instantiates the Category 750 column with a default value of "Operational Table", indicating certain operation of the database, for all tables in the example 700.

FIG. 4 depicts a flowchart 400 of operations performed by the database decomposition system in block 210 of FIG. 2, in accordance with one or more embodiments set forth herein.

The database decomposition system 120 can begin with either block 410 or block 415, either concurrently or in order. The database decomposition system 120 can also concurrently perform block 413 and block 420 after the curated corpus 310 and the domain verification corpus 330 had been generated in block 410.

The database decomposition system 120 performs blocks 410, 420, 430, and 440 in order. The database decomposition system 120 performs blocks 410 and 413 in order. The database decomposition system 120 performs blocks 415, 425, 435, and 445 in order. The database decomposition system 120 performs block 413 prior to block 445. The database decomposition system 120 performs blocks 450 and 460 in order, subsequent to completing both blocks 410, 420, 430, and 440 and blocks 415, 425, 435, and 445 groups, as well as block 413. The database decomposition system 120 can also perform blocks of FIG. 4 in any other orders or combinations that is consistent with data flows of FIG. 3.

In block 410, the database decomposition system 120 builds the curated corpus 310 based on the domain data sources 301 collected from the database client 101 and the monolith database 115. The domain data sources 301 include design documents, architecture impact documents, incident tickets, data flows, column definitions, and architecture artifacts of the monolith database 115. The database decomposition system 120 obtains the domain data sources 301 as screened, authorized, and curated by the database client 101 or administrators of the database decomposition system 120 as authorized by the administrators. The curated corpus 310 would form a pool of key terms common for the subject domain, from which the terms for the classification machine learning model 320 would be extracted. The database decomposition system 120 also builds a domain verification corpus 330 for the subject domain of the monolith database 115. The database decomposition system 120 can build the curated corpus 310 and the domain verification corpus 330 concurrently based on respective source data. In certain embodiments of the present invention, the curated corpus 310 and the domain verification corpus 330 would be stored in a local storage, a remote/cloud storage using File Transport Protocol (FTP), FileShare, or in FileNet using any integration technique. Then, the database decomposition system 120 proceeds with block 413 and block 420, either concurrently or in order.

In block 420, the database decomposition system 120 generates the classification machine learning model 320 by machine learning with the curated corpus 310 from block 410 as training data. Then, the database decomposition system 120 proceeds with block 430.

In block 430, the database decomposition system 120 extracts key terms for the subject domain from the classification machine learning model 320 built in block 420. Then, the database decomposition system 120 proceeds with block 440.

In block 440, the database decomposition system 120 filters the keys extracted in block 430 by the domain verification corpus 430. Then, the database decomposition system 120 proceeds with block 450.

In block 413, the database decomposition system 120 builds the domain glossary table 340 based on the domain verification corpus 430. The domain glossary table 340 includes possible domain schema, common subject areas for the domain or a field of industry/business, application, graphs, and compiled from the domain verification corpus 430. Then, the database decomposition system 120 terminates the thread after making the domain glossary table 340 available for use in block 445 and block 460.

In block 415, the database decomposition system 120 builds the entity relation diagram 360 of the monolith database 115 by reverse engineering the monolith database 115. The database decomposition system 120 also independently builds the graph model 350 of the entities based on the domain specific information, as being selected for the domain verification corpus 330. The entities represented in the graph model 350 are based on subject domain information, while the entities represented in the entity-relation diagram 360 are technicality of the monolith database 115. Then, the database decomposition system 120 proceeds with block 425.

As noted above, the database decomposition system 120 maps domain specific information of the curated corpus 310 and the domain verification corpus 330 into the graph model 350. The database decomposition system 120 builds the entity-relation diagram 360 of the monolith database 115. Details of the entity-relation diagram 360 of the MDB 115 and the graph model 350 are presented in FIG. 3 and corresponding description.

In block 425, the database decomposition system 120 compares nodes of the graph model 350 with the entity relation diagram 360 resulting from block 415 for key entities. The database decomposition system 120 also compares nodes of the graph model 350 with the domain verification corpus 330 resulting from block 410 to examine any entity description in the domain verification corpus 330 should be stored in the domain glossary table 340. The database decomposition system 120 builds the graph model 350 based on the domain data sources without any training at first in block 415, and trains the graph model 350 based on the comparison with the entity-relation diagram 360 and the domain verification corpus 330. In this specification, term "key entities" indicates a set of entities that are required to represent all entities of the monolith database 115. The database decomposition system 120 removes any nodes corresponding to non-key entities of the entity relation diagram 360 from the graph model 350. Examples of non-key entities include, but are not limited to, intersection tables, referential tables. Table 2 620 of FIG. 6 is an example of non-key entity in the MDB 115. The database decomposition system 120 prunes non-key entity nodes from the graph model 350 and represent interrelationships represented by the non-key entity tables as edges in the graph model 350. Then, the database decomposition system 120 proceeds with block 435.

In certain embodiments of the present invention, the database decomposition system 120 classifies nodes of the graph model 350 using graph convolutional network such that the graph model 350 would specify correlations along the hierarchy of the nodes in the graph model 350, where a close relation would be represented by an edge coupling parent tables and child tables. In certain embodiments of the present invention, the database decomposition system 120 compares the graph model 350 with the domain verification corpus 330, the entity-relation diagram 360, and the domain glossary table 340, by use of greedy algorithm. In certain embodiments of the present invention, the database decomposition system 120 communicates non-key entities of the ERD 360 that are not required in the nodes of the graph model 350 to the database client 101 for review on whether to prune the non-key entities from the graph model 350 such that the DDB 140 would be designed according to the graph model 350. If the database client 101 authorizes the graph model 350 as being pruned with nodes corresponding to non-key entities, the database decomposition system 120 adopts the graph model 350 as an abstract data model for the distributed database 140.

In block 435, the database decomposition system 120 decomposes nodes of the graph model 350 as resulting from block 425 further based on functionality to suit the distributed database 140 better. The database decomposition system 120 breaks down the key entities represented in the nodes of the graph model 350 into minimally usable unit entities or with a smaller number of attributes in each entity or for unit queries and creates new nodes corresponding to the decomposed entities in the graph model 350, based on configured rules for entity decomposition in the database decomposition system 120. Then, the database decomposition system 120 proceeds with block 445.

In certain embodiments of the present invention, the database decomposition system 120 decomposes entities into two sets of tables including unit query CRUD tables and entity life cycle state tables. Entity life cycle states typically include New, Managed, Removed, and Detached. For example, for a key entity Order, the database decomposition system 120 decomposes nodes to Order Create node, Order Read node, Order update node, and Order delete node. The database decomposition system 120 further decomposes entities based on functional requirements and non-functional requirements of performance, scalability, and availability, as presented in block 230, more specifically in block 850, and in block 250, more specifically in block 1220 and in block 1230, and corresponding descriptions.

In block 445, the database decomposition system 120 fills in respective entity descriptions for each node of the graph model 350 resulting from block 435, based on validating the entity description based on the domain glossary table 340 resulting from block 413. The database decomposition system 120 makes sure that entity names, attribute names, and values of the attributes appearing in the graph model 350 are based on the domain glossary table 340, thus relevant to the subject domain for the database client 101. Then, the database decomposition system 120 proceeds with block 450.

In certain embodiments of the present invention, the database decomposition system 120 generates a description of an entity by examining any name of a table corresponding to a node in the graph model 350, any column names of a table if no table name corresponds to the node in the graph model 350. The database decomposition system 120 further examine subject areas by value in the tables or in the domain verification corpus 330 if no match is found in values in the tables. In cases where the database decomposition system 120 does not end up with none of the aforementioned names and values, then the database decomposition system 120 leaves the entity description as null as a preconfigured default value or prompts the database client 101 for entity description, according to the configuration for operations of the database decomposition system 120.

In block 450, the database decomposition system 120 verifies the entity descriptions for each node of the graph model 350 by comparing with the key terms resulting from block 440. As noted above, the key terms from block 440 had been extracted from the classification machine learning model 320 at block 430 and filtered by the domain verification corpus 330. As noted above, the database decomposition system 120 had prepared the key terms by first extracting from the classification machine learning model 320 as being trained with the curated corpus 310, and then by screening against the domain verification corpus 330. In certain embodiments of the present invention, the database decomposition system 120 utilizes certain NLP analysis tools for analyzing the entity descriptions represented in the graph model 350 in text and apply threshold criteria for verification with respect to semantics of the text of the entity descriptions. In other embodiments of the present invention, the database decomposition system 120 configures a predefined set of entity descriptions in the domain verification corpus 330. Then, the database decomposition system 120 proceeds with block 460.

In block 460, the database decomposition system 120 populates the metadata table 370 for entities based on the graph model 350 resulting from block 450 and the domain glossary table 340 resulting from block 413. The metadata table 370 includes attributes/columns of a table name representing entities of the nodes in the graph model 350, a subject area of the tables according to the domain glossary table 340, description of the tables based on the domain glossary table 340, and a category of the tables indicating a functionality/type of the tables, respectively. The database decomposition system 120 will later update the category column values for entities in the metadata table 370 in block 940 of FIG. 9, after transactions of the monolith database 115 are prepared for the distributed database 140. Each row in the metadata table 370 represents a table corresponding to a node in the graph model 320. The database decomposition system 120 includes tables/entities of the metadata table 370 in a data model for the distributed database 140. An example of the metadata table 370 is presented in FIG. 7 and corresponding description above. Then, the database decomposition system 120 proceeds with block 230 of FIG. 2.

Figure 8:
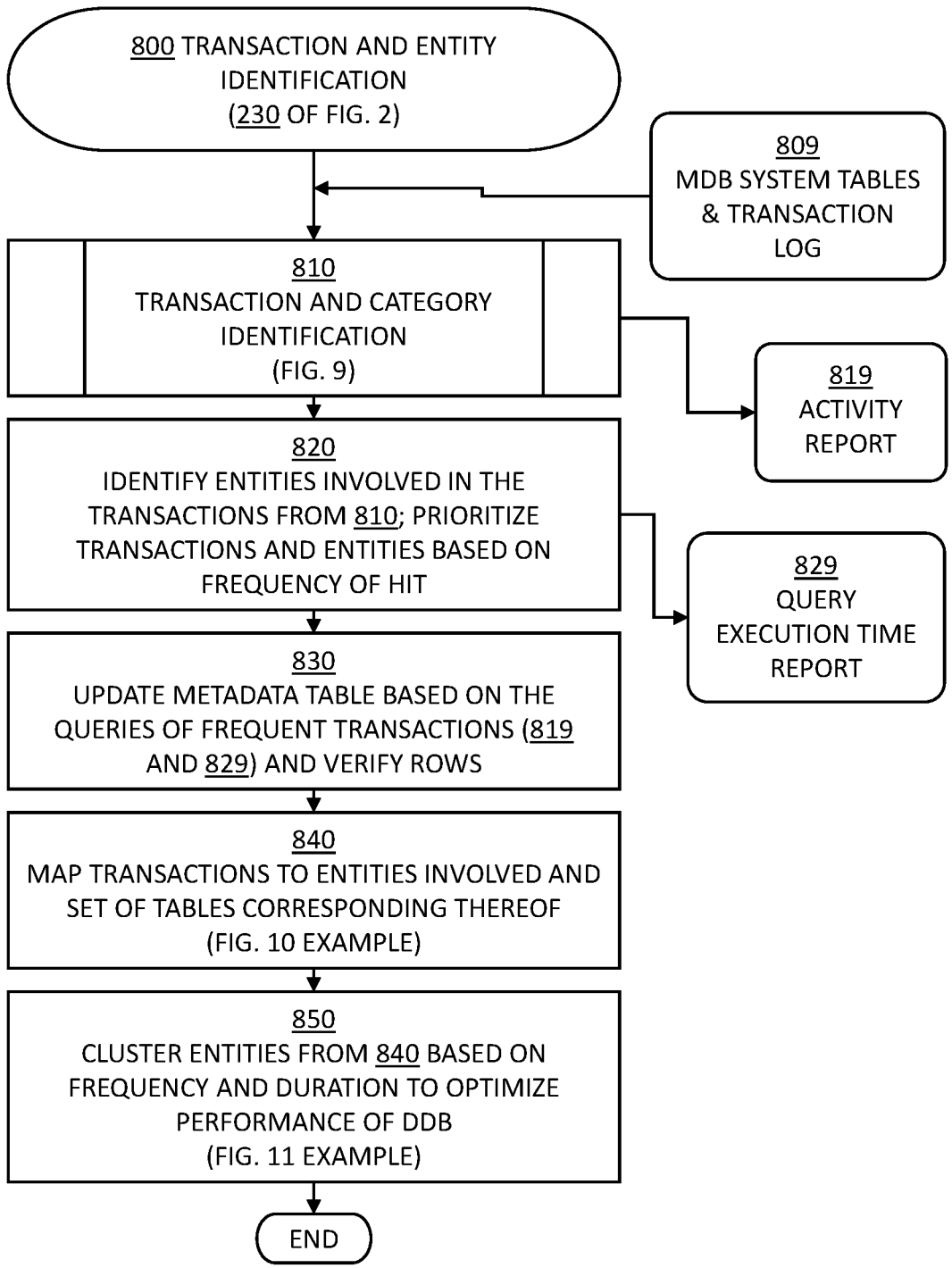
FIG. 8 depicts a flowchart of operations performed by the database decomposition system in block 230 of FIG. 2, in accordance with one or more embodiments set forth herein.
Figure 9:
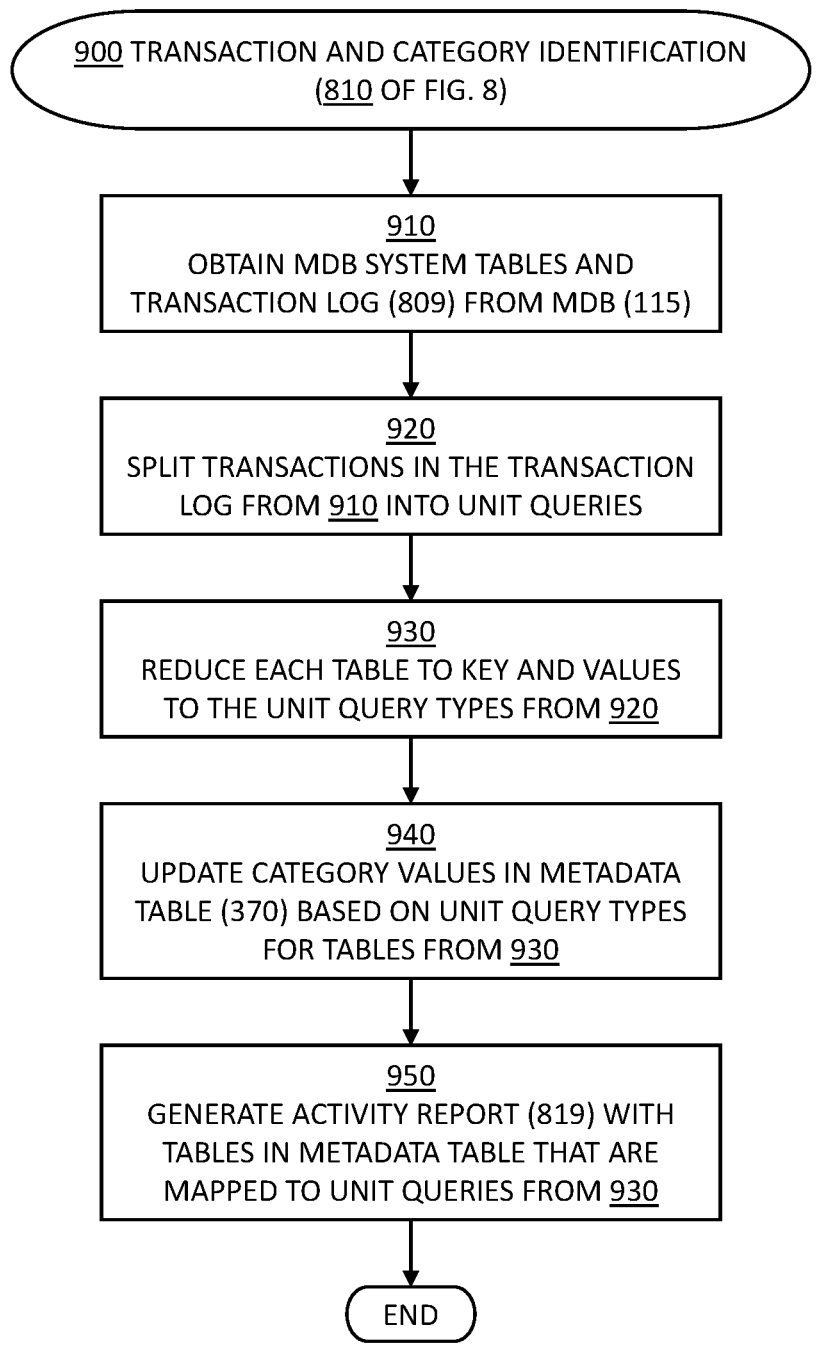
FIG. 9 depicts a flowchart of operations performed by the database decomposition system in block 810 of FIG. 8, in accordance with one or more embodiments set forth herein.

In decomposing the MDB 115 into the DDB 140, the database decomposition system 120 performs various modeling by machine learning. By identifying and decomposing entities of the monolith database 115, the database decomposition system 120 prepares entities of the distributed database 140 represented as nodes in the graph model 350. The metadata table 370 represents the entities of the distributed database 140 after the entities are prepared at the end of block 210. After transforming entities, the database decomposition system 120 continues transforming the transactions of the monolith database 115 into transactions of the distributed database 140. During the process of transforming the transactions, the database decomposition system 120 further decomposes entities and divides tables for the distributed database 140, based on requirements for distributed transaction as shown in FIGS. 8-9 and corresponding descriptions. Entities and tables of the monolith database 115 is typical to relational databases and more cohesive than the entities and tables of the distributed database 140, which supports granularity with the entities and tables corresponding to the distributed transactions. The entities and tables in the distributed database 140 would be further separated after clustering the entities and tables based on non-functional requirements set for the distributed database 140 such as performance, scalability, and availability.

Conventional dichotomy of monolith application and microservices does not apply on architecture level of the embodiments of the present invention, because the distributed database transactions 161, 163 for the distributed database system 130 are focused on data service level operations to be transformed to meet the functional and non-functional requirements based on the distributed database 140 based on the monolith database 115. Particularly, the database decomposition system 115 decomposes and transforms entities in the monolith database 115 into entities of the distributed database 140 as well as transforming the monolith application 113 into the distributed database transactions 161, 163.

FIG. 8 depicts a flowchart 800 of operations performed by the database decomposition system in block 230 of FIG. 2, in accordance with one or more embodiments set forth herein.

At the conclusion of block 210, as detailed in FIG. 4, the database decomposition system 120 produces various data components shown in FIG. 3 in identifying and decomposing entities of the monolith database 115 for the distributed database 140. The entity-relation diagram 360 representing entities and relations of the monolith database 115 are decomposed to suit the functionalities of the distributed database system 130 and represented by the graph model 350 and the metadata table 370. The graph model 350 represents key entities as decomposed for the distributed database 140 and the metadata table 370 identifies and describes information on the key entities corresponding to the graph model 350. The metadata table 370 in the same embodiments as described in FIGS. 3, 4 and 7 include attributes of table identifier, table name, description, subject area, and category in for each table, as prepared for the distributed database 140 in block 210 of FIG. 2. In block 230 of FIG. 2, subsequent to block 210, the database decomposition system 120 decomposes the MDB application 113 into the DDB transactions 161, 163 and further processes the entities/tables prepared for the distributed database 140 for the DDB transactions 161, 163 and updates the metadata table 370 accordingly. The blocks 810 through 850 are component processes of the database decomposition system 120 in performing block 230 of FIG. 2 as noted above.

In block 810, the database decomposition system 120 identifies transactions on the monolith application 113 and respective categories of the transactions, based on statistics of the monolith database 115, shown as MDB system tables and transaction log 809 in FIG. 8. The database decomposition system utilizes various diagnostic tools for the monolith database 115 as most of commercial relational databases employed as the monolith database 115 support system monitoring tools for database activities at transaction level and reporting information on execution of queries as presented in the MDB system tables and transaction log 809. The database decomposition system 120 splits the transactions present into unit query then reduces each table involved in the transactions to a table-query tuple which represent types of unit queries operating on each table as values for the table key. The database decomposition system 120 updates the metadata table 370 with the tables and respective descriptions based on the key values discovered for the transactions as split into unit queries. The database decomposition system 120 then generates an activity report 819 with tables from the table-query tuples as being mapped to the metadata table 370. In certain embodiments of the present invention, the activity report 819 includes frequently used queries, with identifiers, types, and texts of the queries. Details of operations performed in block 810 in transaction and category identification are presented in FIG. 9 and corresponding description. Then, the database decomposition system 120 proceeds with block 820.

In the same embodiments as block 460 of FIG. 4 and the example 700 of the metadata table 370 presented in FIG. 7 of the present invention, the database decomposition system 120 inserts more rows for tables for newly created transactions as being split based on the unit queries comprising respective transactions in the metadata table 370. The database decomposition system 120 updates the category column in the metadata table 370 for each table listed in the metadata table 370 with one of {"OPERATIONAL TABLE", "STATUS TABLE", "TOOL SPECIFIC TABLE"}, which had been previously instantiated with a default value of "OPERATIONAL TABLE" in block 460 of FIG. 4. The category value of "OPERATIONAL TABLE" in the metadata table 370 indicates the table, represented as a record/row in the metadata table 370, is of operational category, indicating that the table represents a query/command operation of the monolith database 115. A table having a category value of "STATUS TABLE" in the metadata table 370 indicates that the table represents a status of a data object entity of the monolith database 115. A table having a category value of "TOOL SPECIFIC TABLE" in the metadata table 370 indicates that the table represents an entity, either an operation or a data object, that is specific to a certain tool used in the monolith database system 110, as in network interface, API, etc. Details of updating the category value in the metadata table 370 for tables are presented in block 940 of FIG. 9 and corresponding description.

In block 820, the database decomposition system 120 identifies entities involved in the transactions identified in block 810. The database decomposition system 120 also prioritizes, based on frequency of hit of the transactions in the monolith database 115, the transactions identified in block 810 and the entities involved thereof, according to information of the MDB system tables and transaction log 809 and of the activity report 819 from block 810. The database decomposition system 120 ranks unit queries in the transactions by respective frequencies of hit of the transactions. The database decomposition system 120 generates a query execution time report 829, listing the unit queries in the frequently hit transactions, including an identifier of each query unique in the monolith database 115, texts of each unit query, respective start time stamps and durations of each unit query per execution. The database decomposition system 120 discovers and records frequently hit unit queries and entities in the query execution time report 829 in preparation of performance, scalability, and availability-based modeling of the entities because the frequently hit unit queries and entities are suitable for optimization based on selected non-functional requirements modeling because the frequently hit unit queries and entities perform significant portion of workload/number of accesses of the monolith database 115. The database decomposition system 120 checks the durations of the unit queries longer than a preconfigured threshold to determine any unit queries accessing the monolith database 115 longer than other queries and consequently blocking other queries from accessing the monolith database 115 for a time longer than the preconfigured threshold. Then, the database decomposition system 120 proceeds with block 830.

In block 830, the database decomposition system 120 updates the metadata table 370 based on the queries of frequent transactions as identified and specified in the activity report 819 and the query execution time report 829. At the beginning of block 830, the metadata table 370 includes the category values instantiated in block 810, as presented in block 940 of FIG. 9 and corresponding description. The database decomposition system 120 updates the metadata table 370 in block 830 to reflect the changes in the transactions and the entities involved therein as identified in block 820, by adding a new row for a new table or by removing an existing row according to current status and values of tables corresponding to the transaction and involved entities as tables listed in the metadata table 370 might have been changed in blocks 810 and 820. After the update in block 830, the metadata table 370 would correctly represent the transactions as processed in blocks 810 and 820 and the entities involved in the transactions. For the remaining rows in the metadata table 370, the database decomposition system 120 would have verified entities and relations previously presented in the metadata table 370 based on the entity-relation diagram 360 and the graph model 350. Then, the database decomposition system 120 proceeds with block 840.

In block 840, the database decomposition system 120 maps the transactions to the entities involved with the transaction and a set of tables in the monolith database 115 corresponding to respective transactions and the entities. The database decomposition system 120 identifies query text of the transactions in the activity report 819 as prioritized by frequency in the query execution time report 829. The database decomposition system 120 examines the entity-relation diagram 360 for tables referenced in the transaction text and corresponding entities. The database decomposition system 120 produces the entity-transaction-tables mapping for all transactions identified with tables involved, as being listed on the activity report 809. Then, the database decomposition system 120 proceeds with block 850.

Figure 10:
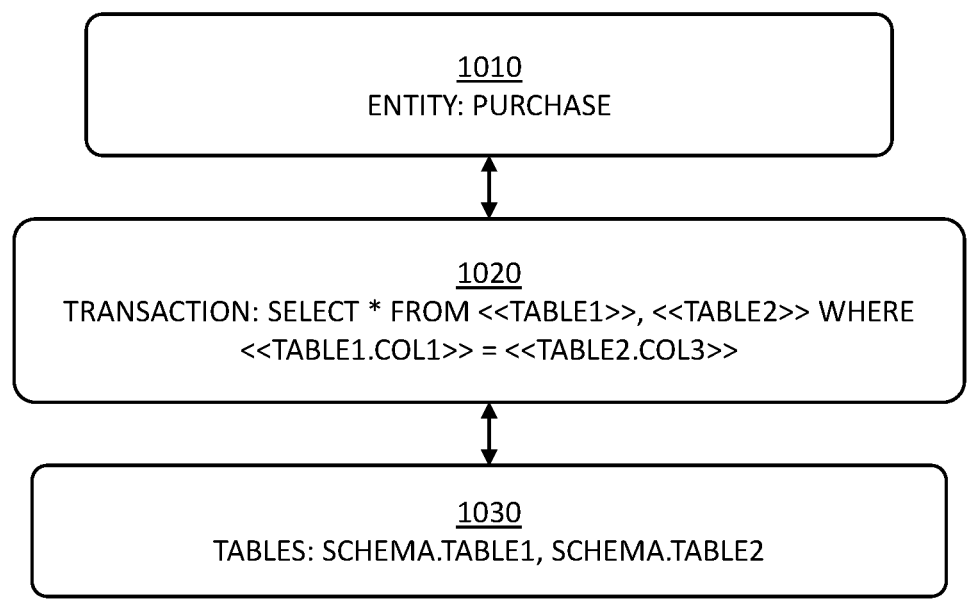
FIG. 10 depicts an example of a mapping between an entity, a transaction, and involved tables as made in block 840 of FIG. 8, in accordance with one or more embodiments set forth herein.

FIG. 10 depicts an example 1000 of a mapping between an entity, a transaction, and involved tables resulting from block 840 of FIG. 8, in accordance with one or more embodiments set forth herein. An entity "PURCHASE" 1010 involves a transaction "SELECT*FROM <<TABLE1>>, <<TABLE2>>WHERE <<TABLE1.COL1>>=<<TABLE2.COL3>>" 1020. The transaction 1020 involves two tables "SCHEMA.TABLE1, SCHEMA.TABLE2" 1030, as the two tables identified as "TABLE1" and "TABLE2" appear in the transaction 1020, where "SCHEMA" indicates a list of all tables represented in the monolith database 1150. The database decomposition system 120 builds a mapping amongst the entity 1010, the transaction 1020, and the tables 1030 to represent relations in the monolith database 115 to prepare for the distributed database 140.

In block 850, the database decomposition system 120 performs NFR modeling to optimize performance of the distributed database 140 by silhouette clustering of frequency and duration of entities resulting from block 840. The database decomposition system 120 separates certain rows of the tables representing the entity based on silhouette clustering when the certain rows of the tables behave differently from the rest of the tables for the same entity, in terms of frequencies and durations. A table 1100 shown in FIG. 11 depicts a candidate table for performance-based node separation resulting from block 850 of FIG. 8, as presented below. The database decomposition system 120 separates the rows of the tables with execution time or frequency distinctively different from the rest of the rows of the table into a new table such that a single table involved in a transaction would have cohesive frequencies and execution times. Accordingly, the database decomposition system 120 can allocate more processing resource for any transaction with longer execution time or utilize a parallel processing based on dependencies of operations within the transaction or store the newly separated table in a specific node in the DDB 140 with a storage having faster access, in order to optimize the performance of transactions involving the newly separated table with a long execution time. Similarly, the database decomposition system 120 may also configure any frequently hit transaction and involved tables for a high-performance processor or nodes running on a faster storage. Then, the database decomposition system 120 proceeds with block 250 of FIG. 2.

FIG. 11 depicts an example of an entity in a table 1100 as a candidate for performance-based node separation resulting from block 850 of FIG. 8, in accordance with one or more embodiments set forth herein. The table 1100 has five (5) attributes of "TABLE ID", "WHERE CLAUSE", "VALUES", "FREQUENCY", and "TIME TAKEN". The table 1100 represents tables identified by "TABLE ID" attribute 1110, which is accessed by one or more queries, according to text of the queries reported in the activity report 819, and as ranked per frequency from the query execution time report 829. The queries access four (4) columns/properties/attributes of in the table "T1", including "COLUMN1", "COLUMN2", "COLUMN3", and "COLUMN4" as shown in "WHERE CLAUSE" attribute 1120. The columns of the table T1 have respective values, as shown in the "VALUES" attribute 1130. In the table T1, "COLUMN1" property has been accessed fifty (50) times, as shown by a value of the "FREQUENCY" attribute 1140 for T1.COLUMN1 row. Also the COLUMN1 of the table T1 has been accessed for the duration of two hundred (200) minutes, as shown by a value of the "TIME TAKEN" attribute 1150 for T1.COLUMN1 row. Accordingly, the database decomposition system 120 determines that the T1.COLUMN1 had been accessed most frequently amongst four columns of the table T1, and a mean duration per access for T1. COLUMN1 would be four (4) minutes. Similarly in the table T1, "COLUMN2" property has been accessed twenty (20) times, as shown by a value of the "FREQUENCY" attribute 1140 for T1.COLUMN2 row. Also the COLUMN2 of the table T1 has been accessed for the duration of ten (10) minutes, as shown by a value of the "TIME TAKEN" attribute 1150 for T1.COLUMN2 row. Accordingly, the database decomposition system 120 determines that the T1.COLUMN2 had been accessed second most frequently amongst four columns of the table T1, and a mean duration per access for T1. COLUMN2 would be a half (0.5) minute. Similarly in the table T1, "COLUMN3" property has been accessed ten (10) times, as shown by a value of the "FREQUENCY" attribute 1140 for T1.COLUMN3 row. Also the COLUMN3 of the table T1 has been accessed for the duration of ten (10) minutes, as shown by a value of the "TIME TAKEN" attribute 1150 for T1.COLUMN3 row. Accordingly, the database decomposition system 120 determines that the T1.COLUMN3 had been accessed third most frequently amongst four columns of the table T1, and a mean duration per access for T1. COLUMN3 would be one (1) minute. The database decomposition system 120 discovers that "COLUMN4" property of the table T1 has been accessed two (2) times, as shown by a value of the "FREQUENCY" attribute 1140 for T1.COLUMN4 row. Also the COLUMN4 of the table T1 has been accessed for the duration of three hundred (300) minutes, as shown by a value of the "TIME TAKEN" attribute 1150 for T1.COLUMN4 row. Accordingly, the database decomposition system 120 determines that the T1.COLUMN4 had been accessed least frequently amongst four columns of the table T1, and a mean duration per access for T1. COLUMN4 would be one hundred and fifty (150) minutes.

The database decomposition system 120 determines a number of clusters, as denoted by k in k-means clustering, based on instances of the attributes of "TABLE ID", "WHERE CLAUSE", "VALUES", "FREQUENCY", and "TIME TAKEN". in the table 1100. For performance modeling of the example 1100, the database decomposition system 120 is configured to have the mean access/operation time for data objects in a same cluster to be cohesive when the number of clusters is three, that is, k=3. As noted above, the database decomposition system 120 checks respective frequencies 1140 and duration of access time 1150 for each column in the table T1 for performance modeling by use of silhouette clustering. Based on a combination of the "FREQUENCY" value of two (2) and the "TIME TAKEN" value of three hundred (300), the database decomposition system 120 first determines that the property represented in "COLUMN4" in the table T1 to be a separate node because the frequency is significantly less than the rest of the properties in the table T1 as well as the duration of access is significantly longer than the rest of the properties in the table T1. Similarly, because the property represented in "COLUMN2" in the table T1 takes the mean access/operation time significantly less than the rest of the properties in the table T1, the database decomposition system 120 determines that the COLUMN2 in the table T1 to be another separate node. Accordingly, the database decomposition system 120 would have three (3) separate nodes for the table 1100, that is [{COLUMN1, COLUMN3}, {COLUMN2}, {COL- UMN4}] having respective cohesive performance behavior within each node as measured by respective frequencies and operation times. By clustering similar properties of cohesive performance behaviors in each node of the distributed database 140, the performance of the distributed database 140 would be more predictable for each node of the distributed database 140. Also, computing time and resources for the distributed database 140 can be planned to maximize effect with performance improvement targeting most frequently accessed nodes in the distributed database 140, which is more efficient than any performance improvement available in the monolith database 115 without wasting the computing resources on infrequently accessed nodes. For silhouette clustering by the frequency and execution time, or any other characteristics employed herein, the database decomposition system 120 would add more distance amongst data points COLUMN4, COLUMN2, and a group including COLUMN1 and COLUMN3 in order to emphasize the dissimilarity amongst the data points based on the preconfigured condition such that the condition is converted into the silhouette coefficient for node separation.

FIG. 9 depicts a flowchart 900 of operations performed by the database decomposition system in block 810 of FIG. 8, in accordance with one or more embodiments set forth herein.

As noted in block 810, the database decomposition system 120 processes the transactions on the monolith database 115 for the distributed database 140 based on various use characteristics of the transactions as collected by the monolith database system 110. Particularly, the database decomposition system 120 prepares the transactions in the MDB application 113 into DDB transactions 161, 163 by splitting the transactions in the MDB application 113 into individual queries and by reducing each table used in the individual queries to key values as used in the individual queries, in blocks 910 through 930.

In block 910, the database decomposition system 120 obtains the MDB system tables and transaction log 809 from the monolith database 115. The MDB system tables and transaction log 809 present various diagnostics information upon monitoring the activities of the MDB application 113 accessing the monolith database 115 at transaction level, including queries in the transactions, with identifiers and types of the respective queries, and texts of the queries. The MDB system tables and transaction log 809 also includes frequencies and/or start time stamps of the queries. Then, the database decomposition system 120 proceeds with block 920.

In block 920, the database decomposition system 120 splits the transactions of the MDB application 113 listed in the MDB system tables and transaction log 809, specifically, the MDB transaction log, into unit queries appearing in the transactions of the MDB application 113. For example, for a transaction having queries of "insert", "update", "delete", and "select" queries, the database decomposition system 120 would split the transaction to four (4) of the unit queries appearing in the transaction. Then, the database decomposition system 120 proceeds with block 930.

In block 930, the database decomposition system 120 reduces each table involved in the unit queries from block 920 to a table-query tuple which represent types of unit queries operating on each table as values for the table key. Accordingly, the database decomposition system 120 forms (key, values) tuples having each of the tables involved in the unit queries as a key and respective types of the unit queries as values, such as (Table1, insert, update) or (Table2, select). Then, the database decomposition system 120 proceeds with block 940.

In block 940, the database decomposition system 120 updates values of the category column in the metadata table 370 based on unit query types for the tables involved in the transactions, as presented in the table-query tuples from block 930. The database decomposition system 120 determines new values of the category column in the metadata table 370 by use of a category modeling that determines a category value for a table based on the unit query types in the table-query tuples. The database decomposition system 120 trains the category model by cross checking statistics information from the MDB system tables and transaction log 809 and the category values determined by the category model of the database decomposition system 120, as the category values determined by the category model and corresponding transaction heuristics accumulate over time. Then, the database decomposition system 120 proceeds with block 950.

In the same embodiments of the present invention as the example 700 of the metadata table 370 in FIG. 7, the database decomposition system 120 generates new values for the Category column in the metadata table 370, which had been instantiated with a default value "Operational Table" for all tables. The database decomposition system 120 configures three (3) values of {"Operational Table", "Status Table", "Tool Specific Table"} available for the Category column in the metadata table 370.

In the same embodiments as above, the database decomposition system 120 determines if a table is paired with which of the four (4) types of select, insert, update and delete queries in the table-query tuple from block 930. If the database decomposition system 120 determines that the table-query tuple has all four (4) select, insert, update and delete queries, then, the database decomposition system 120 determines that the Category value for the table is "Operational Table". Or if the database decomposition system 120 determines that the table-query tuple has two (2) types of select and update queries, then, the database decomposition system 120 determines that the Category value for the table is "Status Table". Or if the database decomposition system 120 determines that the table-query tuple has only insert query, then, the database decomposition system 120 determines that the Category value for the table is "Tool Specific Table". As noted above, the Category column of the metadata table 370 indicates how the table represented by the value of the Category column is used in the monolith database 115 and/or in the distributed database 140.

In block 950, the database decomposition system 120 generates the activity report 819 with tables in the metadata table 370 that are mapped to unit queries from block 930, based on database use statistics available from the MDB system tables and transaction log 809. In certain embodiments of the present invention, the database decomposition system 120 includes frequently used queries, described with respective identifiers, types, and query texts, for each table in the activity report 819. As noted, the MDB system tables and transaction log 809 includes database use statistics available from activity monitoring offered by most of database systems currently in use such as Automatic Workload Repository (AWR) and/or Active Session History (ASH) report in Oracle® database systems. (Oracle is a registered trademark of Oracle Corporation in the United States and other countries.) Then, the database decomposition system 120 proceeds with block 820 of FIG. 8.

Figure 12:
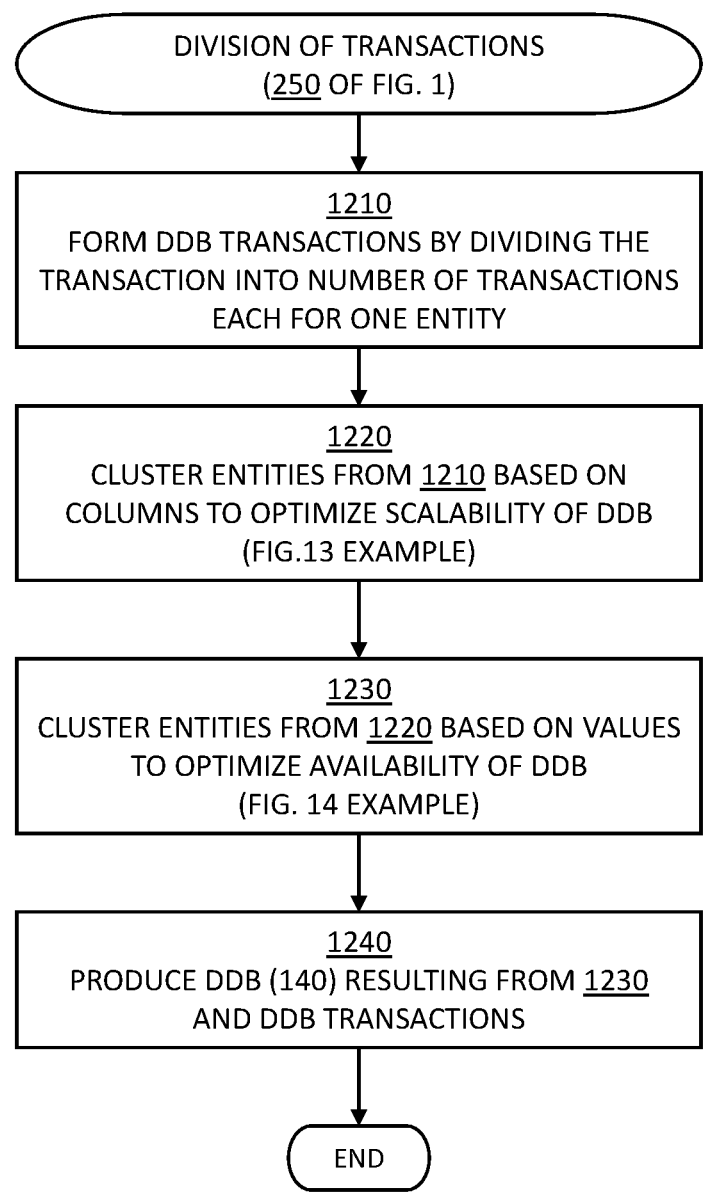
FIG. 12 depicts a flowchart of operations performed by the database decomposition system in block 250 of FIG. 2, in accordance with one or more embodiments set forth herein.

FIG. 12 depicts a flowchart of dividing transactions as performed by the database decomposition system in block 250 of FIG. 2, in accordance with one or more embodiments set forth herein.

Up to block 230 of FIG. 2, the database decomposition system 120 have decomposed entities and transactions of the monolith database system 110 for the distributed database system 130 by removing non-essential entities and splitting transactions into unit queries. The database decomposition system 120 also generated table-unit query tuples by mappings tables involved in transactions and respective unit queries operating on the tables. The database decomposition system 120 has updated the metadata table 370 with a new category values based on modeling of the unit query patterns accessing each table listed in the metadata table 370. In operations of block 250 described in FIG. 12, the database decomposition system 120 finalize division of the transactions for operations in the distributed database 140 and completes NFR modeling to improve scalability and availability of the distributed database 140 over the monolith database 115.

In block 1210, the database decomposition system 120 forms the distributed database transactions 161, 163 by dividing the transactions of the monolith database application 113 into a number of transactions for each entity to operate. The database decomposition system 120 previously split the transactions of the monolith database application 113 into unit queries comprising each transaction and mapped the unit queries to each table involved in the transaction in blocks 920 and 930. Accordingly, the database decomposition system 120 divide the transaction down to single table for single unit query, for parallelism with the distributed database transaction 161, 163. For example, the database decomposition system 120 divide a monolith database transaction represented with a table-unit queries tuple (Table1, insert, update) resulting from block 930 into (Table1, insert) and (Table1, update), to facilitate concurrent operations of the unit queries on the same table "Table1" stored in respective distributed database nodes 141, 151. Then, the database decomposition system 120 proceeds with block 1210.

The parallelism in the distributed database 140 is a major advantage over the monolith database 115 as many queries operated on one instance of a data object in the monolith database 115 is prone to deadlock in which one of the queries accessing a data object is holding the data object indefinitely and all other queries await the data object to be released for operation. By having multiple distributed instances of the same entity per functionality of a transaction, either unit queries of the transaction and other administrative operations on status and usage monitoring, the distributed database 140 operates without deadlock or any other congestion issues inherent in the monolith database 115, with minimal time for table scanning. For the same example as above, in cases where another monolith database transaction updates status of the table "Table1", then, the database decomposition system 120 divides the monolith database transaction into three (3) distributed database tables of (Table1, insert), (Table1, update), and (Table1, status) for respective accesses and operations by the DDB transactions 161, 163.

In block 1220, the database decomposition system 120 clusters entities resulting from block 1210 by silhouette clustering of columns to optimize scalability of the distributed database 140. As noted in block 850 above, the database decomposition system 120 performs NFR modeling to optimize scalability of the distributed database 140 based on columns of tables of the distributed database 140. The database decomposition system 120 separates columns of the tables representing the entity based on silhouette clustering in cases where certain columns of the tables behave differently from the rest of the tables for the same entity, in terms of certain preconfigured condition. A table 1300 shown in FIG. 13 depicts a candidate table for scalability-based separation resulting from block 1220 of FIG. 12, as presented below. Then, the database decomposition system 120 proceeds with block 1230.

FIG. 13 depicts an example of an entity in a table 1300 as a candidate for scalability-based node separation resulting from block 1220 of FIG. 12, in accordance with one or more embodiments set forth herein. The table 1300 has three (3) attributes of "TABLE ID", "COLUMN/TABLE", and "TIME TAKEN". The table 1300 represents tables identified by "TABLE ID" attribute 1310, which is accessed by one or more unit queries undisclosed herein, as divided at the end of block 1210. The "COLUMN/TABLE" attribute 1330 represents columns accessed along with respective tables identified by the "TABLE ID" attribute 1310. The "TIME TAKEN" attribute 1350 represents respective execution time taken to operate on both a table identified by the "TABLE ID" attribute 1310 and a column identified by the "COLUMN/TABLE" attribute 1330. Base on the values of the "TIME TAKEN" attribute 1350, the database decomposition system 120 determines that only C3 column is likely to be in T1 table as the operation for T1 table and C3 column took only a half minute, as indicated by the value of the "TIME TAKEN" attribute 1350, presuming that the threshold execution time for node separation is one (1) minute. The database decomposition system 120 separates C1 column and C2 column from the T1 table as well as C1 column from T2 table, determining that the C1 and C2 columns are not likely to be in the T1 table, as the execution time for the T1.C1 and T1.C2 rows are respectively longer than the configured threshold execution time for node/table separation. Likewise, C1 column and the T2 table took the longest time amongst all table-column combinations, so the database decomposition system 120 separates the T2 table and the C1 column into individual tables. The database decomposition system 120 will place separated tables in respective nodes of the distributed database 140 according to respective subject areas of the separated tables within the domain that serviced by the distributed database 140. In this specification, "domain" or "subject domain" indicates a field of business or an industry of the database client 101 as noted above in FIG. 1, while "subject area" indicates a department or a particular area of interest within the domain, as noted above in FIG. 3. Accordingly, the database decomposition system 120 will create tables T1.C3, C1, C2, and T2 as a result. By making individual columns into respective tables as shown for C1 column and C2 column, the database decomposition system 120 expands dimensions of the data representation as the columns C1 and C2 are scaled up. For silhouette clustering by the columns, or any other characteristics employed herein, the database decomposition system 120 would add more distance between data points T1, C1, C2, and T2 in order to emphasize the dissimilarity amongst the data points based on the preconfigured condition such that the condition is converted into the silhouette coefficient for node separation.

In block 1230, the database decomposition system 120 further clusters entities resulting from block 1220 by silhouette clustering of values to optimize availability of the distributed database 140. The database decomposition system 120 separates values of the tables representing the entity based on silhouette clustering in cases where certain values of the tables behave differently from the rest of the tables for the same entity, in terms of certain preconfigured condition. A table 1400 shown in FIG. 14 depicts a candidate table for availability-based separation resulting from block 1230 of FIG. 12, as presented below . . . . Then, the database decomposition system 120 proceeds with block 1240.

FIG. 14 depicts an example of an entity in a table 1400 as a candidate for availability-based node separation resulting from block 1230 of FIG. 12, in accordance with one or more embodiments set forth herein. The table 1400 has four (4) attributes of "TABLE ID", "COLUMN", "VALUE", and "TIME TAKEN". The table 1400 represents tables identified by "TABLE ID" attribute 1410, which is accessed by one or more unit queries undisclosed herein, as divided at the end of block 1210. The "COLUMN" attribute 1430 represents columns accessed along with respective tables identified by the "TABLE ID" attribute 1410. The "VALUE" attribute 1450 represents values accessed from the respective tables identified by the "TABLE ID" attribute 1410 and/or the respective columns identified by the "COLUMN" attribute 1430. The "TIME TAKEN" attribute 1470 represents respective execution time taken to operate on the value identified by the "VALUE" attribute 1450 at the table identified by the "TABLE ID" attribute 1410 and the respective columns identified by the "COLUMN" attribute 1430. Base on the respective values of the "TIME TAKEN" attribute 1470, the database decomposition system 120 determines that the first row of the table 1400 indicates that T1 table, C1 column having value of V1 took ten (10) minutes to execute, that the second row of the table 1400 indicates that T1 table, C1 column having value of V2 took a half (0.5) minute to execute, that the third row of the table 1400 indicates that T2 table, C4 column having value of V1 took two (2) minutes to execute, and that the fourth row of the table 1400 indicates that T2 table, C1 column having value of V1 took five (5) minutes to execute. Presuming that the threshold execution time for node separation is greater than one (1) minute, the database decomposition system 120 separates the table T1, the table T2, the column C1 and the value V1 into separate tables but keeps the combination appearing in the second row where the T1 table, C1 column having value of V2 which took a half (0.5) minute to execute in one table. For silhouette clustering by the value, or any other characteristics employed herein, the database decomposition system 120 would add more distance between data points in the first, third, and the fourth rows in order to emphasize the dissimilarity amongst the data points that is to be separated based on the preconfigured condition such that the condition is converted into the silhouette coefficient.

In block 1240, the database decomposition system 120 produces the distributed database 140 resulting from block 1230 with the distributed database transactions 161, 163 resulting from block 1210, as the distributed database 140 is fully decomposed and operational as being functionally equivalent to the monolith database system 110 as well as being optimized for the distributed topology in terms of performance, scalability, and availability. Then, the database decomposition system 120 proceeds with block 270 of FIG. 2.

Certain embodiments of the present invention transforms a monolith database system into a distributed database system, by decomposing entities of a monolith database into entities of a distributed database based on entity-relation and functionality of the monolith database system as well as by decomposing monolith database transactions into distributed database transactions performed on the distributed database as decomposed from the monolith database, with optimized performance, scalability, and availability as being facilitated by the distributed topology and technology while guaranteeing operational continuity by providing database functions equal to the monolith database to replace. Certain embodiments of the present invention perform functional modeling of the monolith database based on reverse engineering of the monolith database entity-relation and a graph modeling with an input curated from domain data sources. Certain embodiments of the present invention verify the graph model based on key terms of a subject domain of the monolith database as being classified by a classification machine learning model as trained by a curated corpus of the domain data sources as well as a domain verification corpus and domain glossary tables as compiled based on the key terms and the curated corpus. Certain embodiments of the present invention produce a metadata table listing tables for the monolith database as being reduced to key entities represented in the graph model that reduces redundancy with the tables of the monolith database but preserves functional equivalency. Certain embodiments of the present invention identify transactions used on the monolith database and entities involve in the transactions and transforms monolith transactions into distributed transactions by anatomizing the transactions by unit queries and then by single entity operation for each query. Certain embodiments of the present invention rank the transactions according to the frequency of use on the transactions as shown in the use statistics of the monolith database system and generates a query execution time report for non-functional requirements modeling. Certain embodiments of the present invention update the metadata table for category values of tables in the metadata table based on determining new category values according to types of unit queries in each transaction. Certain embodiments of the present invention perform NFR modeling of tables based on transaction use statistics from the monolith database such that a data element that shows behavior dissimilar to the rest of data elements in the same table/node would be separated into a new table/node by use of silhouette clustering on long operations and frequency to improve performance, scalability, and availability of the distributed database over the monolith database. Certain embodiments of the present invention offer various topology for a distributed database including a primary copy and one or more replica, based on purpose and a level of parallelism required for the distributed database, across geographically separated multiple data centers, multiple machines, and/or multiple storages. Certain embodiments of the present invention assure eventual consistency across all nodes of the distributed database, specifically for multiple instances of the same data object stored in the primary copy and the replica, as supporting relational database as well as non-relational database and other various high-speed, high-availability database technology including in-memory data structure, edge database, and so on. Certain embodiments of the present invention offer the distributed transactions that maintain eventual consistency, high availability, and command and query responsibility segregation (CQRS) in supporting the distributed architecture more efficiently. Certain embodiments of the present invention may be implemented by use of a cloud platform/data center/server farm in various types including a Software-as-a-Service (SaaS), Platform-as-a-Service (PaaS), Database-as-a-Service (DBaaS), and combinations thereof based on types of database modernization project. The database decomposition system can be offered for and delivered to any service providers/business entities/vendors of software applications in need of modernizing a legacy monolithic database system from any location in the world.

Figure 15:
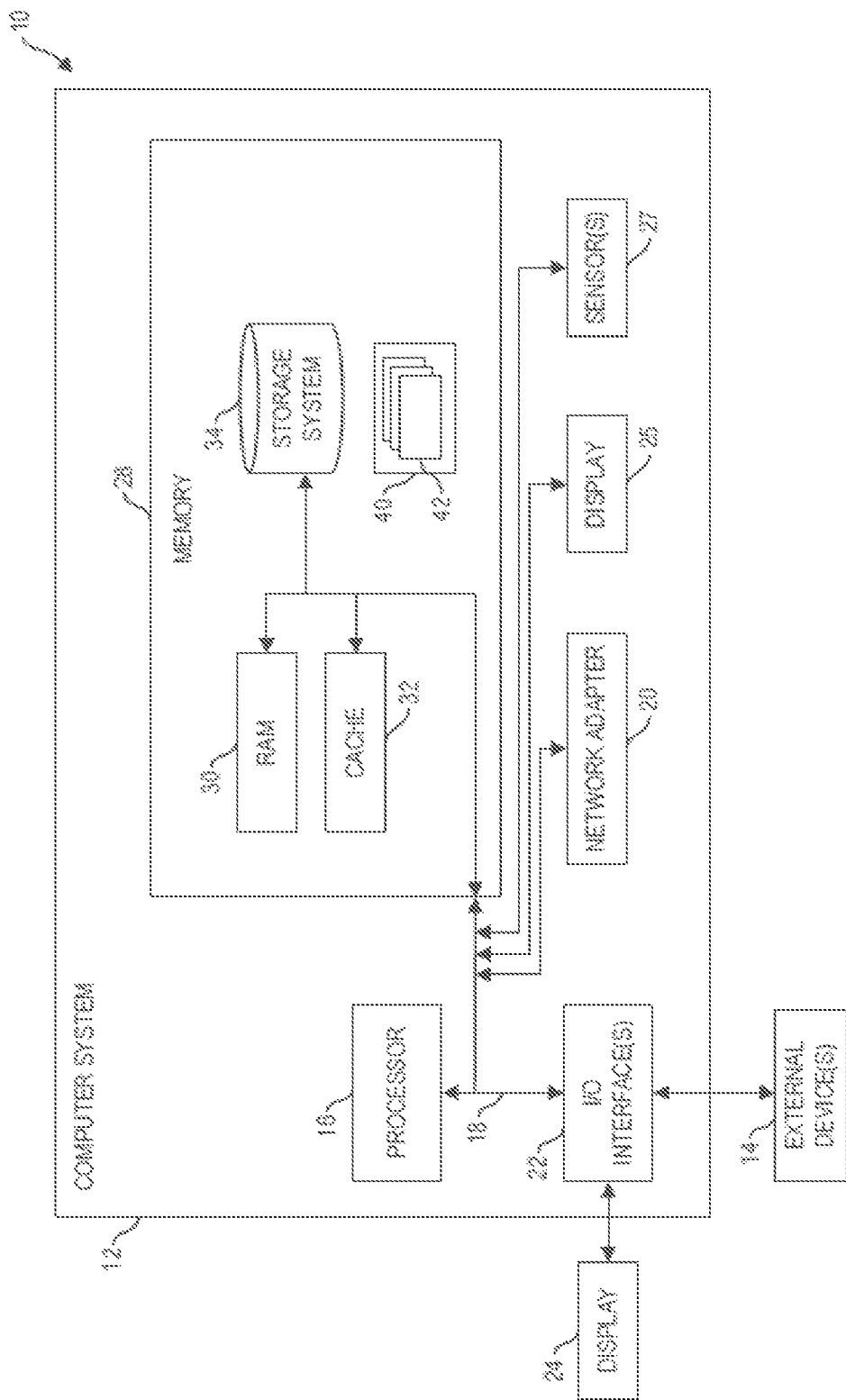
FIG. 15 depicts a cloud computing node according to an embodiment of the present invention.
Figure 16:
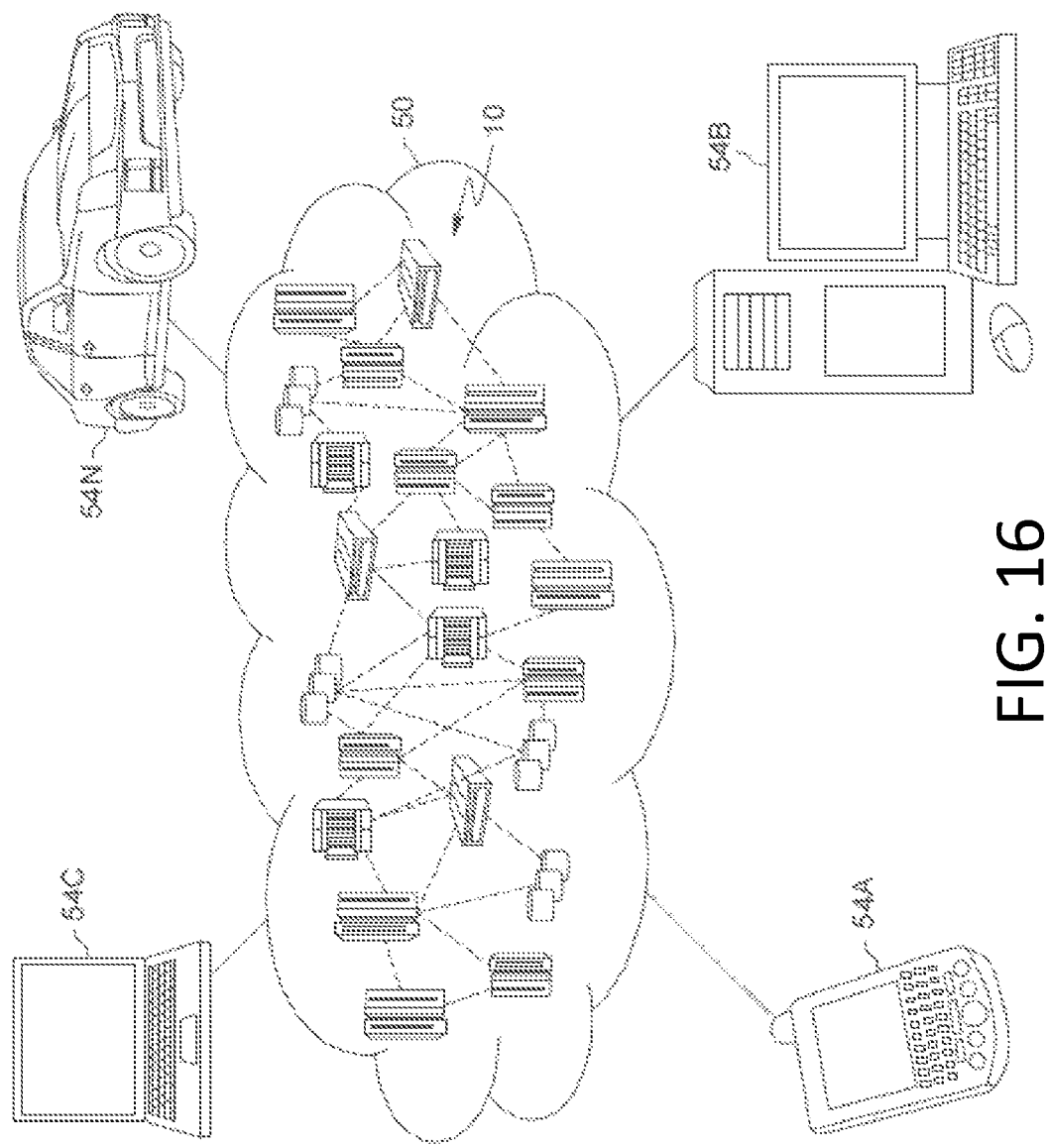
FIG. 16 depicts a cloud computing environment according to an embodiment of the present invention.
Figure 17:
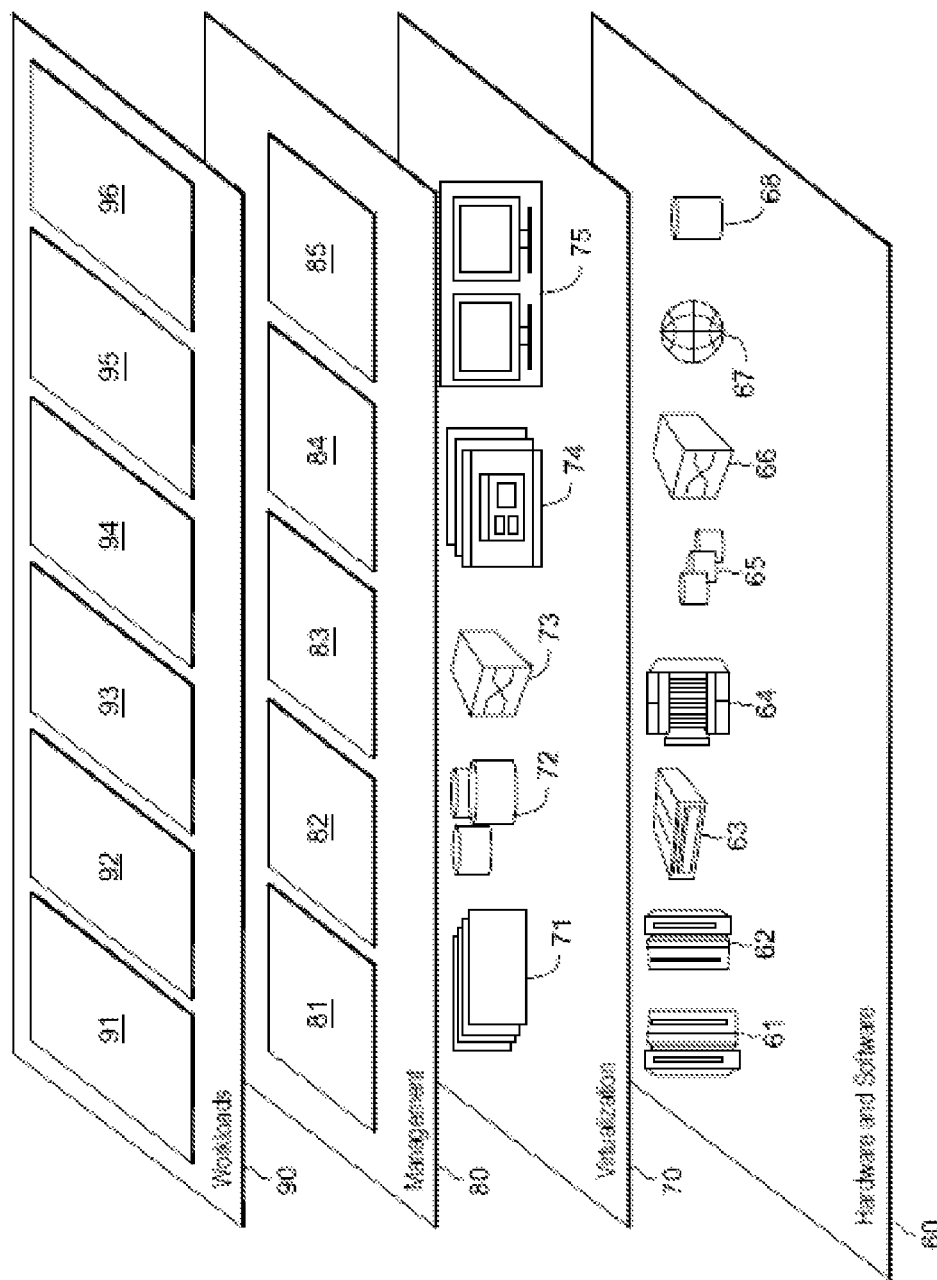
FIG. 17 depicts abstraction model layers according to an embodiment of the present invention.

FIGS. 15-17 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 15, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purposes or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 15, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the database decomposition system 120 of FIG. 2. Program processes 42, as in the database decomposition system 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, Redundant Array of Independent/Inexpensive Disks (RAID) systems, tape drives, and data archival storage systems, etc.

Referring now to FIG. 16, illustrative cloud computing environment 50 is depicted. As shown, cloud computing environment 50 includes one or more cloud computing nodes 10 running the database decomposition system 120 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the database decomposition system including the classification machine learning model, the graph model, and the category model 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   obtaining, by one or more processors, domain data sources on a monolith database of a database client operating in a subject domain;
   identifying, by the one or more processors, entities and relations of the monolith database;
   presenting, by the one or more processors, entities for a distributed database that is functionally equivalent to the monolith database in a metadata table, by decomposing the entities of the monolith database for key entities in the subject domain;
   identifying, by the one or more processors, transactions performed on the monolith database and the entities of the distributed database involved therein;
   decomposing, by the one or more processors, the transactions performed on the monolith database into one or more transactions for the distributed database;
   performing, by the one or more processors, silhouette clustering on the distributed database regarding aspects of performance, scalability, and availability that improves the aspects of the distributed database over the monolith database;
   ascertaining, by the one or more processors, the distributed database provides eventual consistency amongst the distributed database and one or more replicas of the distributed database; and
   deploying, by the one or more processors, the distributed database in place of the monolith database for the database client.

2. The computer implemented method of claim 1, the presenting the entities for the distributed database comprising:
   creating a graph model of the monolith database based on the entities and the relations of the monolith database and verifying against an entity relation diagram of the monolith database, wherein the entity relation diagram is obtained by reverse engineering of the monolith database;
   building a curated corpus for classification modeling for terms of the subject domain, a domain verification corpus with information specific to the subject domain, and a domain glossary table based on terms extracted from the domain verification corpus;
   extracting key terms for the subject domain from a classification machine learning model that had been trained with the curated corpus and screening the key terms against the domain verification corpus; and
   generating the metadata table listing the entities for the distributed database based on the graph model and populating preconfigured attributes of the metadata table according to the graph model and the domain glossary table.

3. The computer implemented method of claim 1, the identifying the transactions performed on the monolith database comprising:
   obtaining system tables and transaction log of the monolith database;
   splitting the transactions listed in the transaction log of the monolith database into unit queries;
   reducing each of the transactions from the splitting into one or more key-value mappings between a key of a table involved in the transactions from the splitting and a value of a list of the unit queries corresponding to the key;

updating the metadata table with a new category value for each of the entities listed in the metadata table, upon determining the new category value based on respective types of the unit queries corresponding to each table from the reducing; and generating an activity report with one or more tables listed in the metadata table which also appear in the system tables and the transaction log of the monolith database from the obtaining.

4. The computer implemented method of claim 1, the decomposing the transactions performed on the monolith database comprising:

prioritizing the transactions performed on the monolith database based on respective frequencies of hit on the transactions;

identifying entities involved in each of the transactions;

verifying the metadata table based on unit queries of the transactions performed on the monolith database; and mapping the transactions to the entities involved in the transactions and tables representing the entities for the tables listed in the metadata table.

5. The computer implemented method of claim 1, the performing the silhouette clustering comprising:

adding a predefined distance between a data point having a frequency and a duration of operations passing a preconfigured threshold and rest of data points in a table and the rest of data points; and optimizing a performance of the distributed database by separating a row including the data point into a new table that is to be stored in a separate node in the distributed database.

6. The computer implemented method of claim 1, the performing the silhouette clustering comprising:

adding a predefined distance between a data point having a mean duration of operations passing a preconfigured threshold and rest of data points in other rows of a table, wherein the data point is specified by a table id and a column id; and optimizing a scalability of the distributed database by separating the rest of the data points of the table by rows and by columns and by creating respective new tables for the rest of the data points and by keeping the data point having the mean duration of operations passing the preconfigured threshold in the table.

7. The computer implemented method of claim 1, the performing the silhouette clustering comprising:

adding a predefined distance between a data point having a mean duration of operations passing a preconfigured threshold and rest of data points in other rows of a table, wherein the data point is specified by a table id, a column id, and a value; and optimizing an availability of the distributed database by separating the rest of the data points of the table by rows, by columns, and by values, and subsequently creating respective new tables for the rest of the data points and by keeping the data point having the mean duration of operations passing the preconfigured threshold with the table id, the column id and the value.

8. A computer program product comprising:

a computer readable storage medium readable by one or more processors and storing instructions for execution by the one or more processors for performing a method comprising:

obtaining domain data sources on a monolith database of a database client operating in a subject domain;

identifying entities and relations of the monolith database;

presenting entities for a distributed database that is functionally equivalent to the monolith database in a metadata table, by decomposing the entities of the monolith database for key entities in the subject domain;

identifying transactions performed on the monolith database and the entities of the distributed database involved therein;

decomposing the transactions performed on the monolith database into one or more transactions for the distributed database;

performing silhouette clustering on the distributed database regarding aspects of performance, scalability, and availability that improves the aspects of the distributed database over the monolith database;

ascertaining the distributed database provides eventual consistency amongst the distributed database and one or more replicas of the distributed database; and deploying the distributed database in place of the monolith database for the database client.

9. The computer program product of claim 8, the presenting the entities for the distributed database comprising:

creating a graph model of the monolith database based on the entities and the relations of the monolith database and verifying against an entity relation diagram of the monolith database, wherein the entity relation diagram is obtained by reverse engineering of the monolith database;

building a curated corpus for classification modeling for terms of the subject domain, a domain verification corpus with information specific to the subject domain, and a domain glossary table based on terms extracted from the domain verification corpus;

extracting key terms for the subject domain from a classification machine learning model that had been trained with the curated corpus and screening the key terms against the domain verification corpus; and generating the metadata table listing the entities for the distributed database based on the graph model and populating preconfigured attributes of the metadata table according to the graph model and the domain glossary table.

10. The computer program product of claim 8, the identifying the transactions performed on the monolith database comprising:

obtaining system tables and transaction log of the monolith database;

splitting the transactions listed in the transaction log of the monolith database into unit queries;

reducing each of the transactions from the splitting into one or more key-value mappings between a key of a table involved in the transactions from the splitting and a value of a list of the unit queries corresponding to the key;

updating the metadata table with a new category value for each of the entities listed in the metadata table, upon determining the new category value based on respective types of the unit queries corresponding to each table from the reducing; and generating an activity report with one or more tables listed in the metadata table which also appear in the system tables and the transaction log of the monolith database from the obtaining.

11. The computer program product of claim 8, the decomposing the transactions performed on the monolith database comprising:
- prioritizing the transactions performed on the monolith database based on respective frequencies of hit on the transactions;
- identifying entities involved in each of the transactions;
- verifying the metadata table based on unit queries of the transactions performed on the monolith database; and
- mapping the transactions to the entities involved in the transactions and tables representing the entities for the tables listed in the metadata table.

12. The computer program product of claim 8, the performing the silhouette clustering comprising:
- adding a predefined distance between a data point having a frequency and a duration of operations passing a preconfigured threshold and rest of data points in a table and the rest of data points; and
- optimizing a performance of the distributed database by separating a row including the data point into a new table that is to be stored in a separate node in the distributed database.

13. The computer program product of claim 8, the performing the silhouette clustering comprising:
- adding a predefined distance between a data point having a mean duration of operations passing a preconfigured threshold and rest of data points in other rows of a table, wherein the data point is specified by a table id and a column id; and
- optimizing a scalability of the distributed database by separating the rest of the data points of the table by rows and by columns and by creating respective new tables for the rest of the data points and by keeping the data point having the mean duration of operations passing the preconfigured threshold in the table.

14. The computer program product of claim 8, the performing the silhouette clustering comprising:
- adding a predefined distance between a data point having a mean duration of operations passing a preconfigured threshold and rest of data points in other rows of a table, wherein the data point is specified by a table id, a column id, and a value; and
- optimizing an availability of the distributed database by separating the rest of the data points of the table by rows, by columns, and by values, and subsequently creating respective new tables for the rest of the data points and by keeping the data point having the mean duration of operations passing the preconfigured threshold with the table id, the column id and the value.

15. A system comprising:
a memory;
one or more processors in communication with the memory; and
program instructions executable by the one or more processors via the memory to perform a method comprising:
- obtaining domain data sources on a monolith database of a database client operating in a subject domain;
- identifying entities and relations of the monolith database;
- presenting entities for a distributed database that is functionally equivalent to the monolith database in a metadata table, by decomposing the entities of the monolith database for key entities in the subject domain;
- identifying transactions performed on the monolith database and the entities of the distributed database involved therein;
- decomposing the transactions performed on the monolith database into one or more transactions for the distributed database;
- performing silhouette clustering on the distributed database regarding aspects of performance, scalability, and availability that improves the aspects of the distributed database over the monolith database;
- ascertaining the distributed database provides eventual consistency amongst the distributed database and one or more replicas of the distributed database; and
- deploying the distributed database in place of the monolith database for the database client.

16. The system of claim 15, the presenting the entities for the distributed database comprising:
- creating a graph model of the monolith database based on the entities and the relations of the monolith database and verifying against an entity relation diagram of the monolith database, wherein the entity relation diagram is obtained by reverse engineering of the monolith database;
- building a curated corpus for classification modeling for terms of the subject domain, a domain verification corpus with information specific to the subject domain, and a domain glossary table based on terms extracted from the domain verification corpus;
- extracting key terms for the subject domain from a classification machine learning model that had been trained with the curated corpus and screening the key terms against the domain verification corpus; and
- generating the metadata table listing the entities for the distributed database based on the graph model and populating preconfigured attributes of the metadata table according to the graph model and the domain glossary table.

17. The system of claim 15, the identifying the transactions performed on the monolith database comprising:
- obtaining system tables and transaction log of the monolith database;
- splitting the transactions listed in the transaction log of the monolith database into unit queries;
- reducing each of the transactions from the splitting into one or more key-value mappings between a key of a table involved in a transaction from the splitting and a value of a list of the unit queries corresponding to the key;
- updating the metadata table with a new category value for each entity listed in the metadata table, upon determining the new category value based on respective types of the unit queries corresponding to each table from the reducing; and
- generating an activity report with one or more tables listed in the metadata table which also appear in the system tables and the transaction log of the monolith database from the obtaining.

18. The system of claim 15, the decomposing the transactions performed on the monolith database comprising:
- prioritizing the transactions performed on the monolith database based on respective frequencies of hit on the transactions;
- identifying entities involved in each of the transactions;
- verifying the metadata table based on unit queries of the transactions performed on the monolith database; and
- mapping the transactions to the entities involved in the transactions and tables representing the entities for the tables listed in the metadata table.

19. The system of claim 15, the performing the silhouette clustering comprising:

adding a predefined distance between a data point having a frequency and a duration of operations passing a preconfigured threshold and rest of data points in a table and the rest of data points; and optimizing a performance of the distributed database by separating a row including the data point into a new table that is to be stored in a separate node in the distributed database.

20. The system of claim 15, the performing the silhouette clustering comprising:

adding a predefined distance between a data point having a mean duration of operations passing a preconfigured threshold and rest of data points in other rows of a table, wherein the data point is specified by a table id and a column id; and optimizing a scalability of the distributed database by separating the rest of the data points of the table by rows and by columns and by creating respective new tables for the rest of the data points and by keeping the data point having the mean duration of operations passing the preconfigured threshold in the table.

* * * * *